United States Patent [19]

Nocentino, Jr.

[11] Patent Number: 5,592,354
[45] Date of Patent: Jan. 7, 1997

[54] AUDIO BANDWIDTH INTERFACE APPARATUS FOR PILOT WIRE RELAYS

[76] Inventor: Albert Nocentino, Jr., 9140 Verree Rd., Philadelphia, Pa. 19115

[21] Appl. No.: 347,288

[22] Filed: Nov. 30, 1994

Related U.S. Application Data

[63] Continuation-in-part of Ser. No. 26,117, Mar. 3, 1993, Pat. No. 5,426,554, which is a continuation of Ser. No. 671,497, Mar. 19, 1991, abandoned.

[51] Int. Cl.$^6$ .................................................. H02H 3/00
[52] U.S. Cl. .................................. 361/69; 361/62; 361/64
[58] Field of Search ................................ 361/62, 64, 66, 361/93, 119, 68, 69

[56] References Cited

U.S. PATENT DOCUMENTS

| | | | |
|---|---|---|---|
| 3,225,256 | 12/1965 | Carter et al. | 317/28 |
| 3,707,651 | 12/1972 | Lensner et al. | 317/28 |
| 4,234,901 | 11/1980 | Strickland, Jr. | 361/64 |
| 4,275,429 | 6/1981 | Church et al. | 361/64 |
| 4,464,697 | 8/1984 | Sun | 361/64 |
| 4,561,120 | 12/1985 | Andow et al. | 455/612 |
| 4,620,257 | 10/1986 | Sano et al. | 361/68 |
| 4,675,774 | 6/1987 | Gonnam et al. | 361/64 |
| 4,675,775 | 6/1987 | Sun et al. | 361/64 |
| 4,751,604 | 6/1988 | Wilkinson | 361/68 |
| 4,782,421 | 11/1988 | Johns et al. | 361/65 |
| 4,935,837 | 8/1990 | Sun | 361/64 |
| 5,267,231 | 11/1993 | Dzieduszko | 361/64 |

Primary Examiner—Jeffrey A. Gaffin
Assistant Examiner—Stephen Jackson
Attorney, Agent, or Firm—William H. Murray

[57] ABSTRACT

An apparatus for enabling pilot wire relays to communicate across voice-grade, non-metallic communication channels converts sinusoid signals representative of phase currents at a location in an electric power distribution system to audio band signals representative of the phase of the current signal at that location. These audio band signals are transmitted over a voice-grade non-metallic communication channel to a remote interface module where they are converted to square waves which are compared against square waves representative of the currents in the electrical power distribution system at that location.

19 Claims, 21 Drawing Sheets

AUDIO BANDWIDTH INTERFACE APPARATUS FOR PILOT WIRE RELAYS

CROSS REFERENCE TO RELATED APPLICATIONS

This application is a continuation in part of U.S. patent application Ser. No. 08/026,117 filed Mar. 3, 1993, now U.S. Pat. No. 5,426,554 which is a continuation of U.S. patent application Ser. No. 671,497, filed Mar. 19, 1991, now abandoned.

BACKGROUND OF THE INVENTION

The present invention relates to electrical power distribution systems and more particularly to apparatus for protecting electrical power distribution lines and equipment.

Protection of power lines and power line distribution equipment is essential in order to provide constant service to all utility customers. Protective relaying is one form of power line protection used by utilities to provide a safe, reliable system of electrical power distribution. To prevent permanent costly damage from occurring to the distribution networks of the utilities, the protective relaying system must be able to clear short-term faults and isolate the protected zone during phase-to-ground, phase-to-phase and three phase faults quickly and reliably. One method of providing this protection is pilot wire relay protection.

Pilot wire relay protection typically utilizes two electro-mechanical relays, one at each end of a protected zone, and a communication channel connecting these relays. Typically, the communication channel is a dedicated telephone line provided by the telephone company which is leased or purchased by the power company. Heretofore, these dedicated paths provided a hardwire current path between the relays. This proved to be very effective in performing pilot wire relay type protection of electrical power distribution lines because the hard wired communication channels allowed for simple current flow across the pilot wire which would close the relays and trip the associated circuit breakers thereby isolating the fault in the electrical power distribution system.

However, with the perfection of non-metallic communication channels, the telephone companies have been upgrading their systems by replacing hard wired telephone communication lines with non-metallic communication channels. Such upgrading presents problems for the power companies which utilize pilot wire relay protection. With the installation of a non-metallic communication channel, there is no longer a wire communication channel over which the current can flow. In addition, the non-metallic communication channels being used by telephone companies, such as The Bell Telephone Series 3002 voice-grade communication channels, have a limited bandwidth in the audio band of approximately 300 to 3000 Hz. The signals which typical pilot wire relays produce occur at 60 Hz. Since such signals are below the lower limit of the bandwidth of such non-metallic communication channels, they will not be transmitted across a communication channel of this type.

It is therefore an object of the present invention to enable pilot wire relays to communicate across voice-grade non-metallic communication channels.

It is another object of the present invention to enable pilot wire relays to communicate over a voice grade lines comprised of either loaded cable pairs, coaxial cable, microwave/cellular systems as well as fibre optic communication channels.

It is yet another object of the present invention to enable pilot wire relays to communicate over such voice grade lines without having to replace or internally modify the existing pilot wire relays.

It is a further object of the present invention to provide means of communicating 60 Hz pilot wire relay signals using audio tones which effectively preserve phase comparison principles and techniques.

It is also an object of the present invention to effectively use audio tones to communicate 60 Hz pilot signals which enable direct transfer trip signals to be transmitted down the communication channel and which provide means for a dual tone direct transfer trip apparatus to accompany the phase comparison audio tone scheme.

It is still another object of the present invention to enable pilot wire relays to communicate over non-metallic communication systems while still preserving true phase comparison signals of both the local and remote sites to be compared.

These and other objects of the present invention will become apparent to those skilled in the art upon consideration of the following description of the invention.

SUMMARY OF THE INVENTION

An audio interface apparatus for use with a protective relay for an electrical power distribution system comprises means for receiving an output signal from the protective relay, which output signal is representative of line current conditions at a predetermined location in an electrical power distribution system. The protective relay output signal is converted into a first square wave signal. At least a first local signal, having a first frequency within the audio band is generated. A local audio bandwidth output signal is generated for transmission to at least one remote audio bandwidth interface apparatus over an audio band communication channel. The local audio bandwidth output signal comprises the first local signal modified by the first square wave. A remote signal, comprising the local audio bandwidth output signal generated by at least one remote audio bandwidth interface apparatus, is received from the audio band communication channel. The remote signal is converted to a second square wave signal. A predetermined delay is imparted to the first square wave signal; and the phase of the delayed first square wave signal is compared with the phase of the second square wave signal. A trip output signal is generated when the phase comparison exceeds predetermined limits.

DETAILED DESCRIPTION

U.S. patent application Ser. No. 08/026,117, filed Mar. 3, 1993, the parent application of this application, is incorporated by reference into this application as if fully set forth herein.

It is desirable, if not essential, to maintain a dedicated communication channel between relays in a pilot wire relay protection system in order to maintain the security and reliability necessary for such protection schemes. Such dedicated communication channels, either metallic or non-metallic, are commonly known as leased telephone channels; that is, private line, non-switched communication channels. These are voice band communication paths that interconnect two or more locations for the purpose of transmitting electrical signals from one location to another. These channels, which typically have usable bandwidths from approximately 300 to 3000 Hz, are now provided over a variety of transmission media including paired wire, multipaired cable, coaxial cable, microwave radio, and optical fibers.

Voice band signals may be transmitted from one location to another entirely as voice frequency signals, or they may be converted to equivalent electrical signals for transmission on analog or digital carrier systems. The decision as to which system particularly fits an application, as well as the support for such system, is entirely within the purview of the telephone company. Combinations of various transmission media and transmission systems are frequently employed by telephone companies so that customer demand for telecommunication services can be met in the most cost effective manner.

The following are channel characteristics of two types of voice band telephone channels. One type is typically widely available as a voice band channel, either basic (non-conditioned) or conditioned, which can be used for a variety of voice band applications including the type of audio-tone protective relaying of the type described and claimed in the present application. The other type is a specially conditioned voice band channel specifically designed for audio tone protective relaying applications. This type of channel is intended to provide increased reliability for protective relaying systems, such as phase comparison systems, through improved signal to noise performance in that portion of the circuit in the immediate vicinity of the power station; that is, between the power station and the serving telephone company central office.

Figure 20:
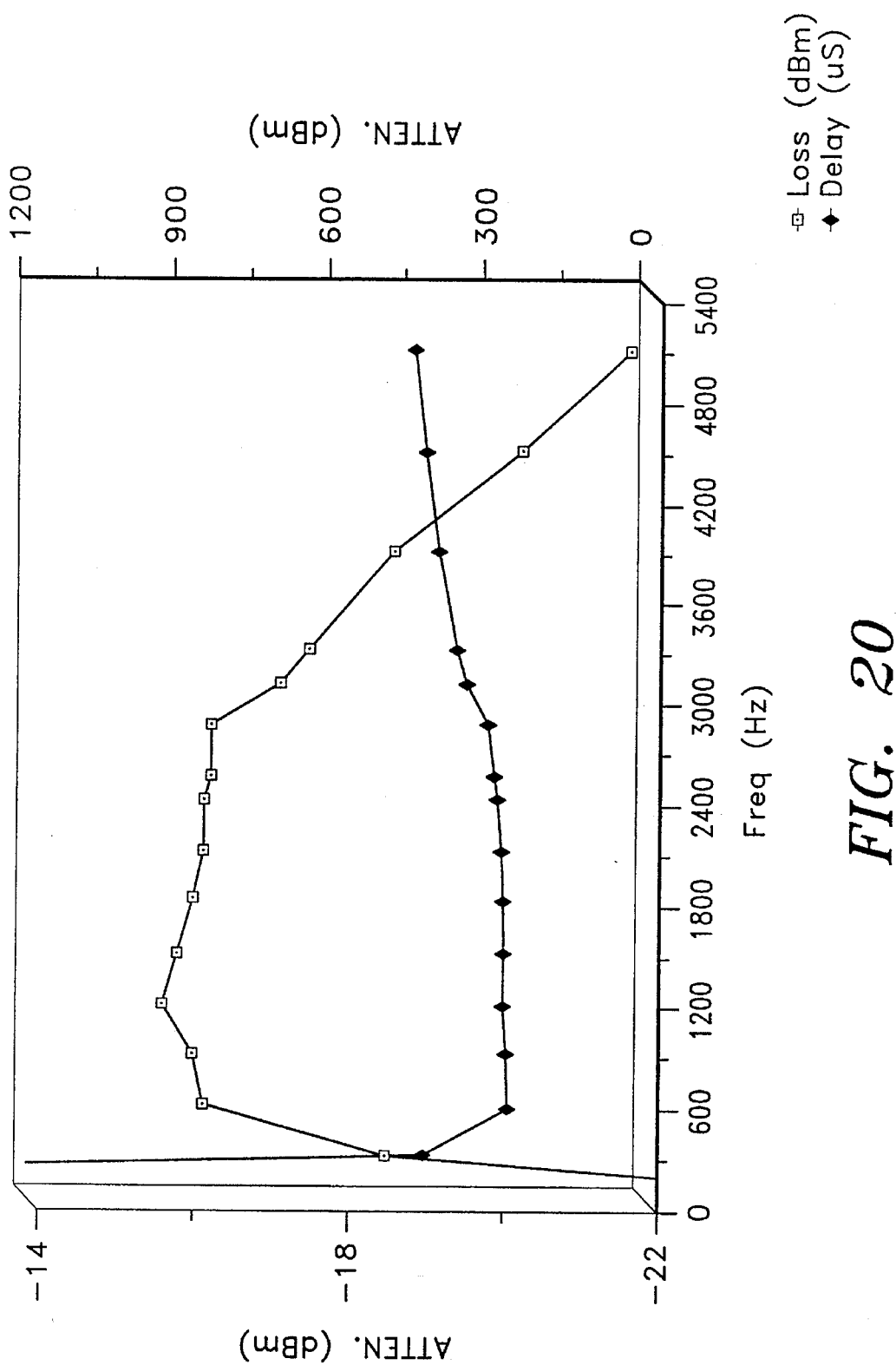
FIG. 20 is a graphical depiction of the attenuation and delay characteristics of a Bell Telephone Series 3002 voice-grade communication channel.

The two parameters which are most critical for telecommunication systems used in phase comparison protective relaying systems are: attenuation of the transmitted signal power as received at the telephone company's receiver input; and the channel delay characteristics; that is, the time delay from transmitter to receiver. FIG. 20 depicts, in graphic form, the attenuation and delay characteristics of a Bell Telephone Series 3002 voice-grade communication channel which is presently being used in many non-metallic communication channels.

Figure 1:
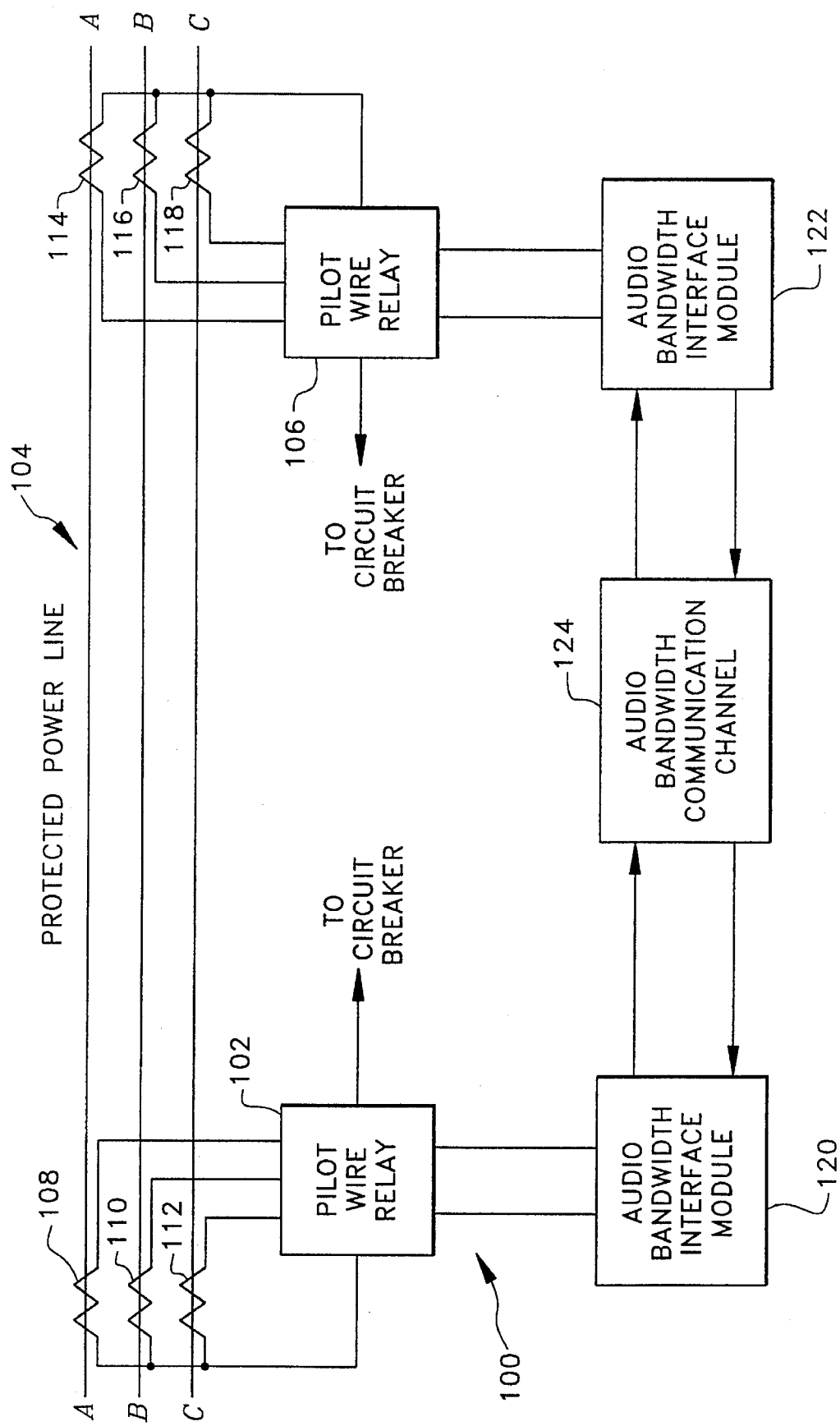
FIG. 1 is a functional block diagram of a pilot wire communication system utilizing audio band interface modules in accordance with the present invention.

Referring now to FIG. 1, there is shown a functional block diagram of a pilot wire relay system, generally designated 100, utilizing an audio bandwidth communication channel and audio bandwidth interface modules in accordance with a preferred embodiment of the present invention. The system 100 includes a first pilot relay 102 positioned at one end of a protected zone of a three phase power distribution line generally designated 104. The three phase power distribution line 104 comprises an A phase, a B phase and a C phase as is known in the art of electrical power distribution. A second pilot wire relay 106 is positioned at the other end of the protected zone of the three phase power distribution line 104.

Current in each of the three phases at one end of the protected zone of the power distribution line 104 is monitored by, for example, three current transformers 108, 110 and 112 as is known in the art. Signals representative of each of these three currents are generated by the current transformers and applied to the first pilot wire relay 102 as is also known in the art. Current flowing at the other end of the protected zone of the three phase electrical power distribution line 104 is sensed by current transformers 114, 116 and 118. Signals generated by the current transformers 114, 116 and 118, representing the three phase currents flowing at the other end of the protected zone are coupled to the second pilot wire relay 106. The first 102 and second 106 pilot wire relays utilize the signals from the current transformers 108, 110, 112, 114, 116 and 118 to detect faults on the electrical power distribution line 104; and they provide output signals for tripping circuit breakers when the fault occurs within the protected zone as is known to those skilled in the art of protective relaying for electrical power distribution systems. An example of such a pilot wire relay is the Westinghouse Corporation Type HCB Pilot Wire Relay as shown and described in Westinghouse Publication Number I.L. 41-971.2G entitled "Installation Operation Maintenance Instructions, Type HCB Pilot Wire Relay System", effective January 1977, which publication is incorporated by reference in this Detailed Description as if fully set forth herein.

A first audio bandwidth interface module 120 is electrically connected to the first pilot wire relay 102. A second audio bandwidth interface module 122 is electrically connected to the second pilot wire relay 106. An audio bandwidth communication channel 124 is connected between the audio bandwidth interface modules 120 and 122. The audio bandwidth communication channel 124 can be any of the voice band communication paths previously described. However, for purposes of this detailed description, the audio bandwidth communication channel is a Bell Telephone series 3002 voice-grade communication channel as previously described.

Figure 2:
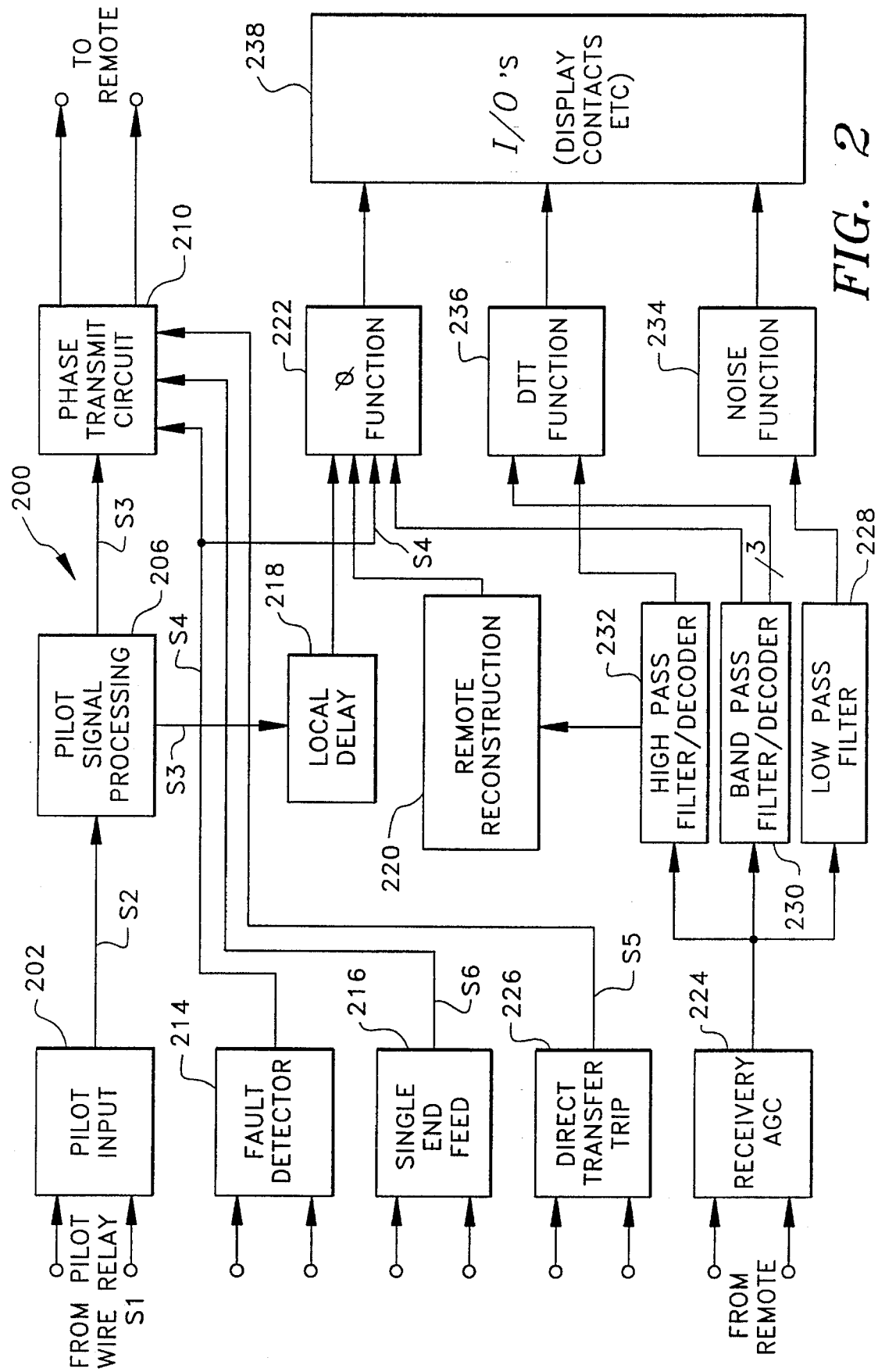
FIG. 2 is a functional block diagram of the preferred embodiment of the audio band interface module of the present invention.

The first audio band interface module 120 is depicted in more detail in FIG. 2. In the preferred embodiment, the second audio bandwidth interface module 122 is the same as the first module 120. Therefore, the description of the first module 120 which follows is also applicable to the second module 122.

Referring now to FIG. 2, there is depicted a block diagram of a preferred embodiment of an audio bandwidth interface module in accordance with the present invention, generally designated 200. The module 200 comprises a pilot input section 202, a fault detector section 214, a single end feed section 216, a direct transfer trip section 226, a receiver/AGC section 224, a pilot signal processing section 206, a phase transmit circuit 210, a local delay section 218, a remote reconstruction section 220, a phase (φ) function section 222, a high pass filter/decoder section 232, a band pass filter/decoder section 230, a low pass filter 228, a direct transfer trip (DTT) function section 236, a noise function section 234 and an input/output (I/O) section 238.

Figure 3:
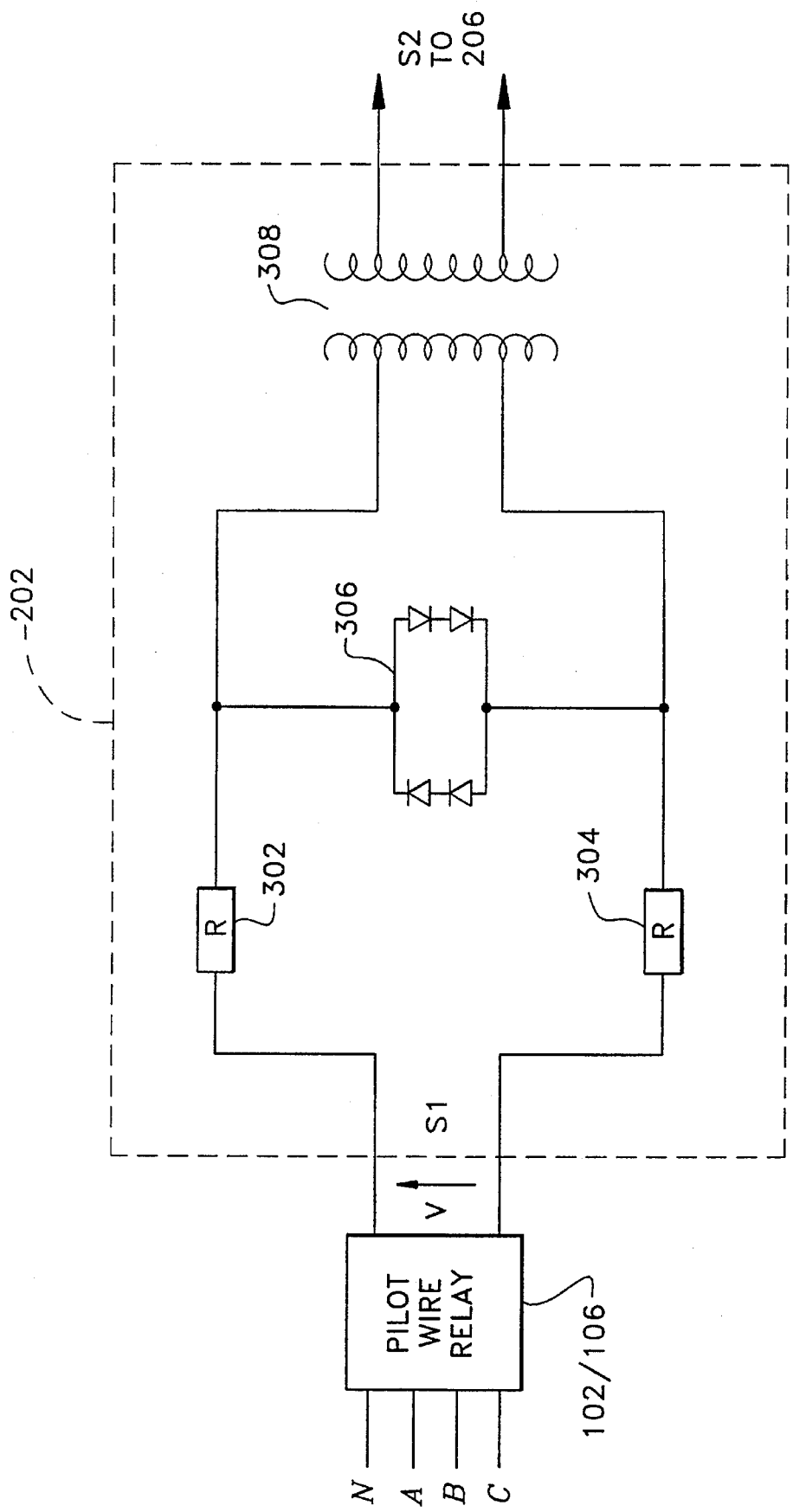
FIG. 3 is a functional block diagram of the pilot input section of the audio band interface module depicted in FIG. 2.

The V signal output of the pilot wire relay 102 is connected to the pilot input section 202. The signal V is a signal which is representative of a combination of the phase voltages. Referring to FIG. 3 the signal V is applied through a pair of resistors 302 and 304, across a diode bridge 306 to the input of an isolation transformer 308. As shown in FIG. 3 the diode bridge 306 and the resistors 302 and 304 present an appropriate load to the pilot wire relay 102. The appropriate load connected here will change the function of the pilot wire relay from pilot wire operation to a fault detection relay. To do this, the audio bandwidth interface module presents to the pilot wire terminals of the pilot wire relay, an appropriate impedance which comprises the resistor 302 and 304 as well as the diode bridge 306. With this load connected to the pilot wire terminals of the pilot wire relay, the pilot wire relay will now act as a fault detector instead of a pilot wire relay which requires a current passing through a pilot wire for operation.

Figure 18A:
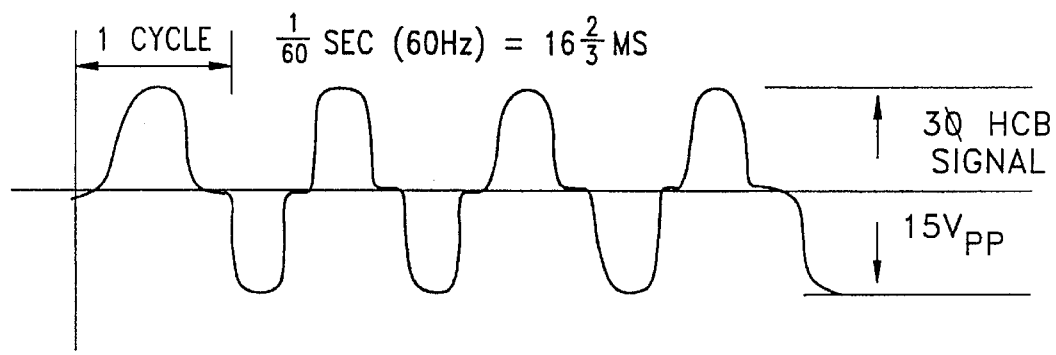
FIGS. 18A through 18G depict exemplary waveforms of signals S1 through S7 respectively.
Figure 18B:
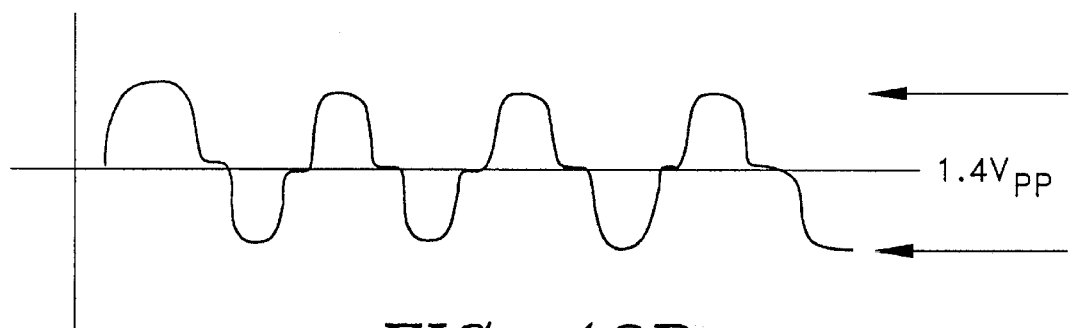

For a Westinghouse Corporation type HCB pilot wire relay system, the signal V is a voltage across pins 18 and 19 as shown, for example, in FIG. 3 of the aforementioned Westinghouse publication, and has a waveform which is exemplified by signal S1 depicted in FIG. 18A. Accordingly, pins 18 and 19 of the type HCB pilot wire relay system are connected to the resistors 302 and 304. For a Westinghouse Corporation type HCB pilot wire relay system, the resistance of each resistor 302 and 304 is preferably 4.75K ohms; and the diode bridge comprises four diodes, preferably type 1N914, connected as shown in FIG. 3. For a General Electric type CPD pilot wire relay, the resistance of each resistor 302 and 304 is preferably 10 ohms. The secondary coil of the isolation transformer 308 is coupled to the pilot signal processing section 206 of the module 200. The output signal across the secondary coil of the isolation transformer 308 is a signal, S2, representative of a phase voltage in the protected power line having an amplitude which is compatible with the input of buffer amplifier 702 of the pilot signal processing portion 206 depicted in FIG. 7, to which the output signal is applied. FIG. 18B depicts an exemplary form of the signal S2.

Figure 7:
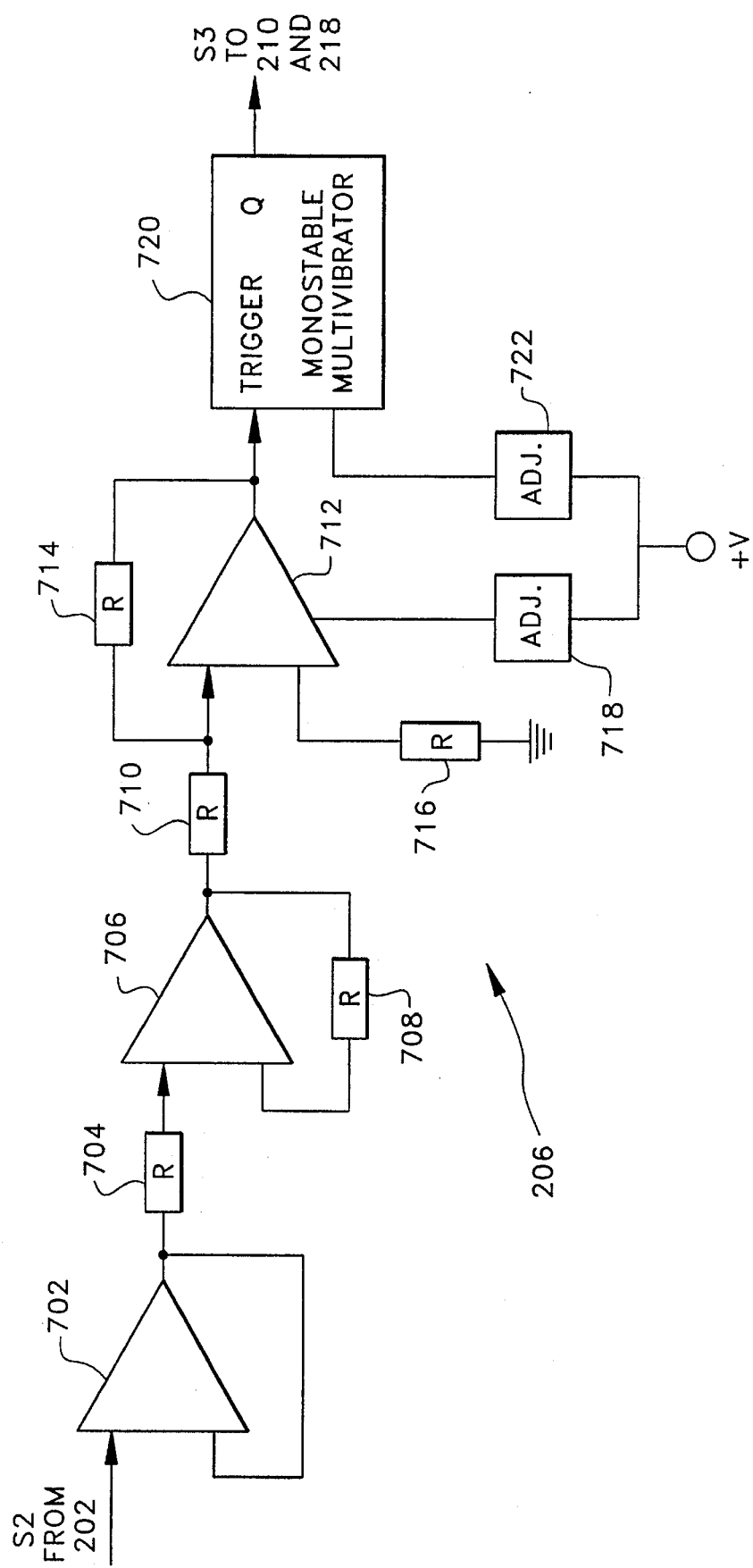
FIG. 7 is a functional block diagram of the pilot signal processing section of the audio band interface module depicted in FIG. 2.

As shown in FIG. 7, the output of the buffer amplifier 702 is coupled to one input of an operational amplifier 706 through a resistor 704. In the preferred embodiment, the buffer amplifier 702 is an Analog Devices Type AD644 operational amplifier. The output of the operational amplifier 706 is coupled to another of its inputs through a resistor 708. In the preferred embodiment, the operational amplifier 706 is a low-noise precision operational amplifier OP-27 manufactured by Precision Monolythics, Inc.; having a gain which is set by the values of resistors 704 and 708 as is known in the art. The buffer amplifier 702 has a gain of 1 and is used to isolate the signal from the pilot input section 202 and to provide sufficient driving capability for the circuits of the pilot signal processing section 206 which follow.

The output of the operational amplifier 706 is also coupled to an input of a voltage comparator 712 through a resistor 710. The voltage comparator 712 is preferably a National Semiconductor Corporation LM111 voltage comparator configured as a zero-crossing detector using resistors 714 and 716, and adjustable resistor 718 such that a sinusoidal input is converted to a square wave output. The output of the voltage comparator 712 is coupled to the input of a monostable multi-vibrator 720. The multi-vibrator 720 is preferably a National Semiconductor CD4538B dual precision monostable multivibrator configured such that adjustable resistor 722 controls the duration of the output pulse from the Q output.

The pilot signal processing section 206 operates as follows. The signal S2 received from the pilot input section 202 is substantially sinusoidal in form as depicted in exemplary form in FIG. 18B and is representative of a phase voltage of the protected power distribution line. This signal is buffered, conditioned and converted into a square wave by buffer amplifier 702, operational amplifier 706 and voltage comparator 712. The monostable multivibrator 720 is then used to adjust the duty cycle of the square wave appearing at the Q output to equal substantially 50%. Consequently, the signal S3 at the Q output of the monostable multivibrator 720 is a square wave representative of a phase voltage at one end of the protected portion of the electrical power distribution line. The signal S3 is depicted in exemplary form in FIG. 18C. The square wave output signal from the monostable multivibrator 720 of the pilot signal processing section 206 is coupled to an input of a phase transmit circuit 210 and a local delay section 218 of the audio band with interface module 200.

Figure 8:
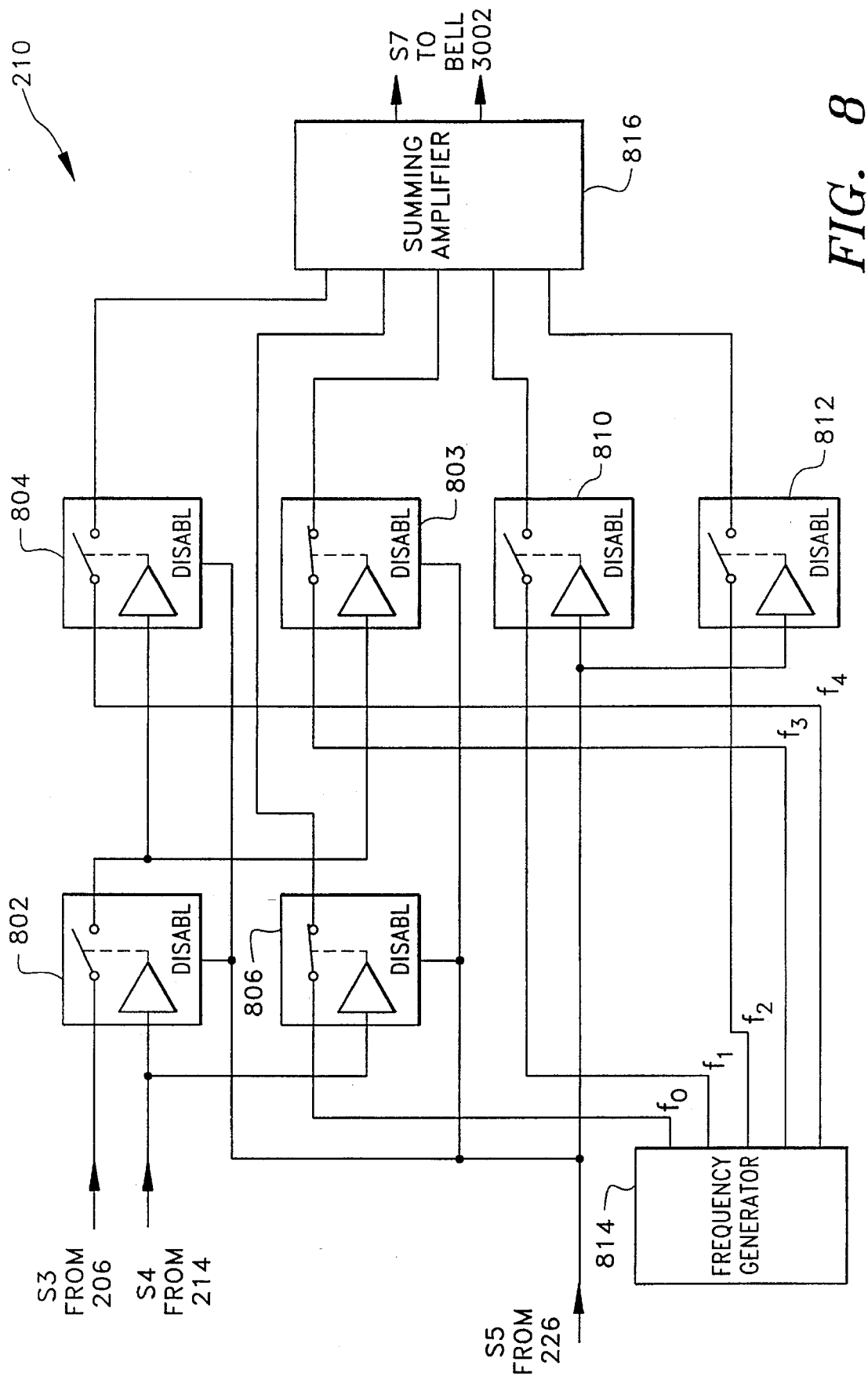
FIG. 8 is a functional block diagram of the phase transmit circuit of the audio band interface module depicted in FIG. 2.

Referring now to FIG. 8, there is shown a functional block diagram of the phase transmit circuit 210. The square wave signal S3 from the pilot signal processing section 206 is coupled to one side of a normally open contact of a first analog switch 802. The other side of the normally open contact is electrically connected to the control inputs of a second analog switch 804 and a third analog switch 808. A first signal output from a frequency generator 814 having a frequency $f_0$ is coupled to one terminal of a normally closed contact of a fourth analog switch 806.

A second signal from the frequency generator 814, having a frequency $f_1$, is coupled to a terminal of a normally open switch contact of a fifth analog switch 810. A third signal, having a frequency $f_2$, is coupled to one terminal of a normally open switch of a sixth analog switch 812. A fourth signal from the frequency generator 814, having a signal $f_3$, is coupled to a terminal of a normally closed switch contact of the third analog switch 808. A fifth signal from the frequency generator 814, having a frequency $f_4$, is coupled to a terminal of a normally open switch contact of the second analog switch 804.

The other terminal of the normally open switch contact of the second analog switch 804 is coupled to an input of multi-input summing amplifier 816. The summing amplifier 816 sums the signals applied to its inputs. Consequently, the output signal from the summing amplifier is a signal which comprises the sum at the input signals. For example, when signals having frequencies $f_0$ and $f_3$ are applied to the inputs of the summary amplifier, the output signal is a signal which comprises the sum of $f_0$ and $f_3$. The output signal from the summing amplifier 816 is coupled to the Bell 3002 communications channel through appropriate filtering and impedance matching circuits as is known by those skilled in the art. The other terminal of the normally closed switch contact of the fourth analog switch 806 is coupled to a second input of the summing amplifier 816. The other terminal of the normally closed switch contact of the third analog switch 808 is coupled to a third input of the summing amplifier 816. The other terminal of the normally open switch contact of the fifth analog switch 810 is coupled to a fourth input of the summing amplifier 816. The other terminal of the normally open switch contact of the sixth analog switch 812 is coupled to a fifth input of the summing amplifier 816.

In the preferred embodiment, the analog switches 802, 804, 806, 808, 810 and 812 are National Semiconductor type Quad SPST JFET Analog Switches. In the preferred embodiment, the frequency generator 814 is preferably a Signetics type PCD3310/A Pulse and DTMF Dialer with Redial which is configured such that $f_0$=1040 Hz; $f_1$=1341 Hz; $f_2$=1638 Hz; $f_3$=1970 Hz; and $f_4$=2470 Hz. A signal, S4 (see FIG. 18D), is coupled from the fault detector section 214 to the control inputs of the first analog switch 802 and the fourth analog switch 806. The characteristics of the signal S4 will be described in connection with the detailed description of the fault detector 214. A signal, S5 (see FIG. 18E), is coupled from the direct transfer trip section 226 to the control inputs of the fifth and sixth analog switches 810 and 812 as well as to the disable inputs of the first, second, third and fourth analog switches, 802, 804, 808 and 806. A signal applied to the disable input will turn off the associated switch independent of the signal applied to the control input. The characteristics of the signal S5 will be described in connection with the detailed description of the direct transfer trip section 226.

Figure 4:
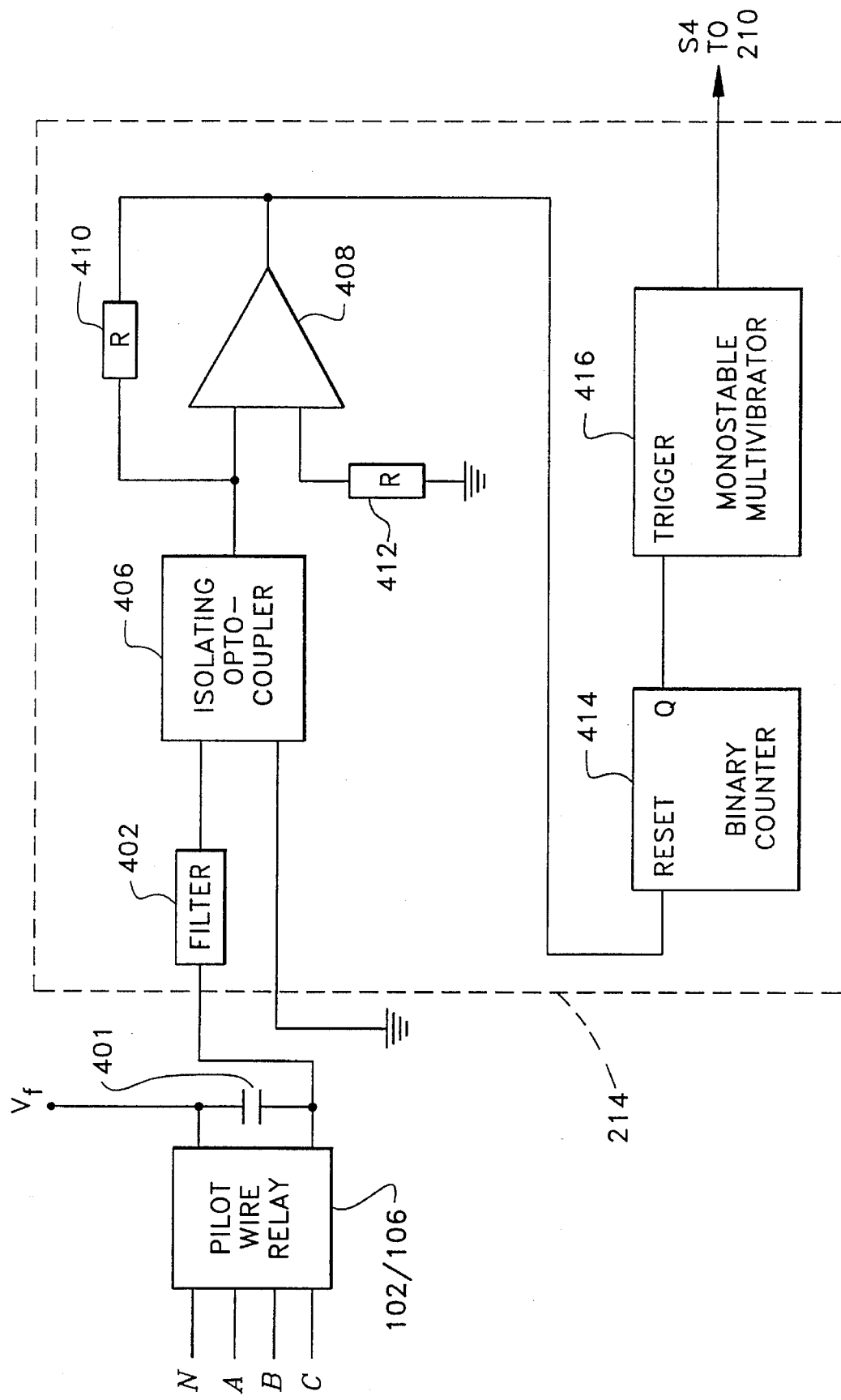
FIG. 4 is a functional block diagram of the fault detector section of the audio band interface module depicted in FIG. 2.

Referring now to FIG. 4, there is shown a detailed block diagram of the fault-detector circuit 214 of the audio bandwidth interface module 200. Upon detection of a fault, the pilot wire relay 102 will produce a voltage $V_f$ voltage which is coupled to an isolating optocoupler 406 through a filter 402. The filter 402 is preferably an RC filter for filtering out noise and voltage spikes which may be generated in the substation environment. The isolating optocoupler is preferably a Hewlett Packard type HCPL-3700/60 Optocoupler. The output from the isolating opto-coupler 406 is a +V for no-fault conditions and becomes 0 V upon receipt of the filtered $V_f$ signal from the pilot wire relay 102.

The output of the isolating optocoupler 406 is coupled to the input of a comparator/level detector 408. In the preferred embodiment, the comparator/level detector 408 is a Motorola type LM139 Comparator. The output of the comparator/level detector 408 is coupled to a reset input of a binary counter 414. The binary counter 414 is preferably a Texas Instrument type SN54HC 4060 Asynchronous Binary Counter. The Q output of the binary counter 414 is coupled to the trigger input of a monostable multivibrator 416. The monostable multivibrator 416 is preferably a National Semiconductor type MM54HC123A Retriggerable Monostable Multivibrator.

Since the input to the comparator/level detector 408 transitions from a plus voltage to ground upon detection of a fault by the pilot wire relay 102, the output of the comparator/level detector 408 also transitions from high to low upon detection of a fault. This signal, applied to the reset input of the binary counter 414, causes the counter 414 to begin counting upon detection of a fault. The Q output of the counter 414 transitions from low to high at a predetermined interval after the input transitions from high to low. Consequently, the Q output of the counter 414 will transition from low to high at a predetermined time after the fault detector 214 receives the fault detection signal from the pilot wire relay 102.

A transition of the signal at the trigger input of the monostable multivibrator 416 from low to high will cause an output at the Q terminal of the multivibrator 416. Consequently, an output signal S4, as depicted in exemplary form in FIG. 18D, will appear at the Q terminal of the monostable multivibrator 416 at a predetermined time following the receipt of a fault-detection voltage from the pilot wire relay 102. The predetermined time period is adjusted to cause a delay in the transition of the S4 signal from a low voltage state (e.g. 0 volts) to a high voltage state (e.g. +5 volts) following receipt of the $V_f$ signal to prevent spurious signals such as voltage spikes from erroneously initiating operation of the fault detection portion of the audio bandwidth module of the present invention. The signal S4 is coupled to the phase transmit circuit 210 as previously described; and is also coupled to the phase function section as will be subsequently described.

Figure 6:
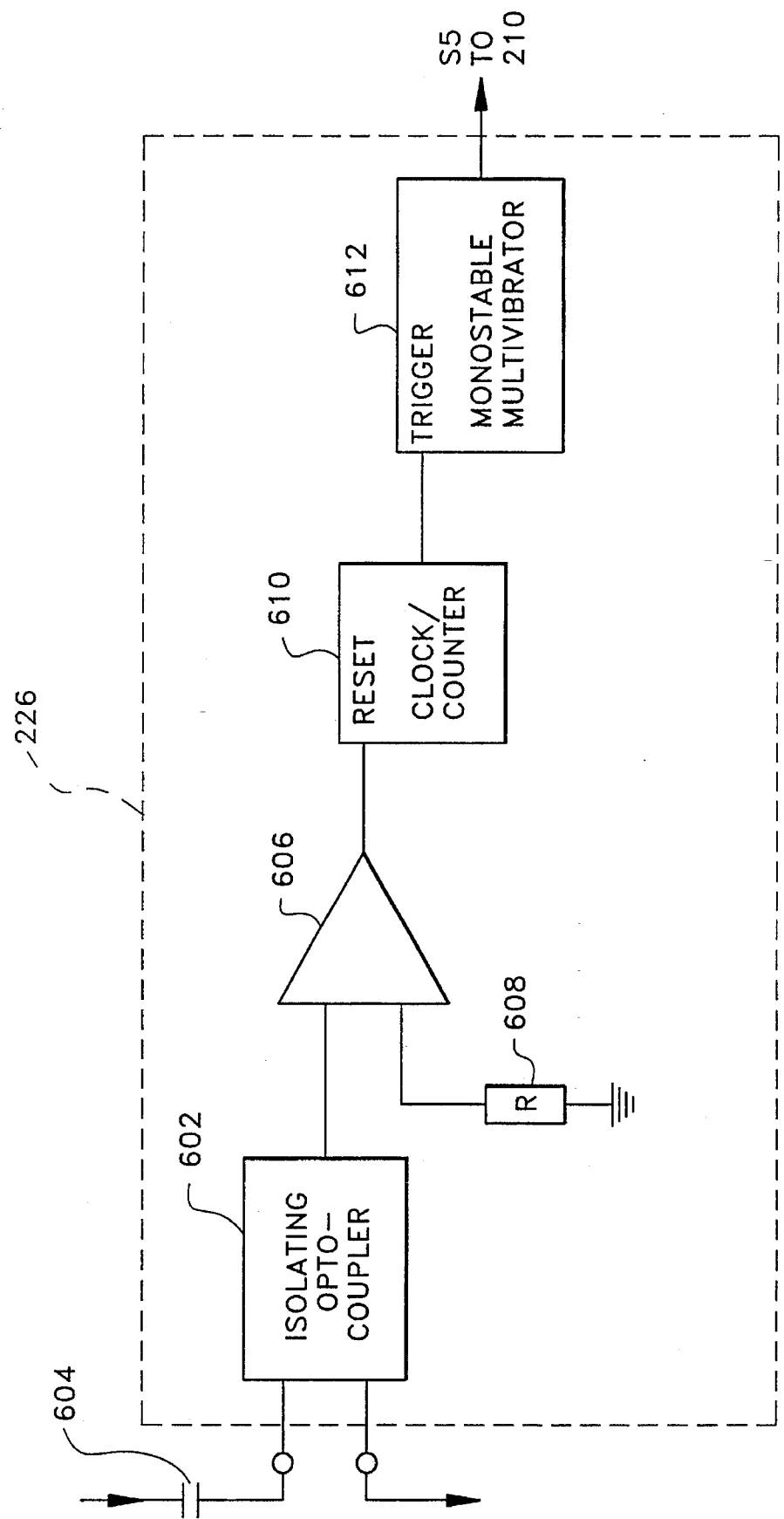
FIG. 6 is a functional block diagram of the direct transfer trip section of the audio band interface module depicted in FIG. 2.

Referring now to FIG. 6, there is depicted a functional block diagram of the direct transfer trip section 226. A set of contacts 604, which are operated by the utility, apply a voltage to an input of an isolating opto-coupler 602. The contacts 604 operate as a result of a direct transfer trip initiated by the utility. Direct transfer trips are typically initiated at one substation to protect devices at another substation from feed at the first substation as is known in the art. For example, if a fault occurs at substation A, a direct transfer trip would be sent to substation B indicating to B that a fault has occurred at A. The isolating optocoupler 602 is preferably a Hewlett Packard type HCPL-3700/60 Optocoupler. The output from the optocoupler 602 is a +V when contacts 604 are open; and becomes 0 V upon receipt of a voltage when the contacts 604 close.

The output of the isolating optocoupler 602 is coupled to the input of a comparator/level detector 606. In the preferred embodiment, the comparator/level detector 606 is a Motorola type LM139 Comparator. The output of the comparator/level detector 606 is coupled to a reset input of a binary counter 610. The binary counter 610 is preferably a Texas Instrument type SN54HC 4060 Asynchronous Binary Counter. The Q output of the binary counter 610 is coupled to the trigger input of a monostable multivibrator 612. The monostable multivibrator 612 is preferably a National Semiconductor type MM54HC123A Retriggerable Monostable Multivibrator.

Since the input to the comparator/level detector 606 transitions from a plus voltage to ground upon closure of contacts 604 as the result of a direct transfer trip, the output of the comparator/level detector 606 also transitions from high to low upon detection of a fault. This signal, applied to the reset input of the binary counter 610, causes the counter 610 to begin counting upon detection of a direct transfer trip. The Q output of the counter 610 transitions from low to high at a predetermined interval after the input transitions from high to low. Consequently, the Q output of the counter 610 will transition from low to high at a predetermined time after receipt of a direct transfer trip.

A transition of the signal at the trigger input of the monostable multivibrator 612 from low to high will cause an output at the Q terminal of the multivibrator 612. Consequently, an output signal S5, as depicted in exemplary form in FIG. 18E, will appear at the Q terminal of the monostable multivibrator 612 at a predetermined time following the closure of contacts 604 as the result of the initiation of a direct transfer trip. The predetermined time period is adjusted to cause a delay in the transition of the S5 signal from a low voltage state (e.g. 0 volts) to a high voltage state (e.g. +5 volts) following closure of the contacts 604 to prevent spurious signals such as voltage spikes from erroneously initiating operation of the fault detection portion of the audio bandwidth module of the present invention. The signal S5 is coupled to the phase transmit circuit 210 as previously described.

Figure 5:
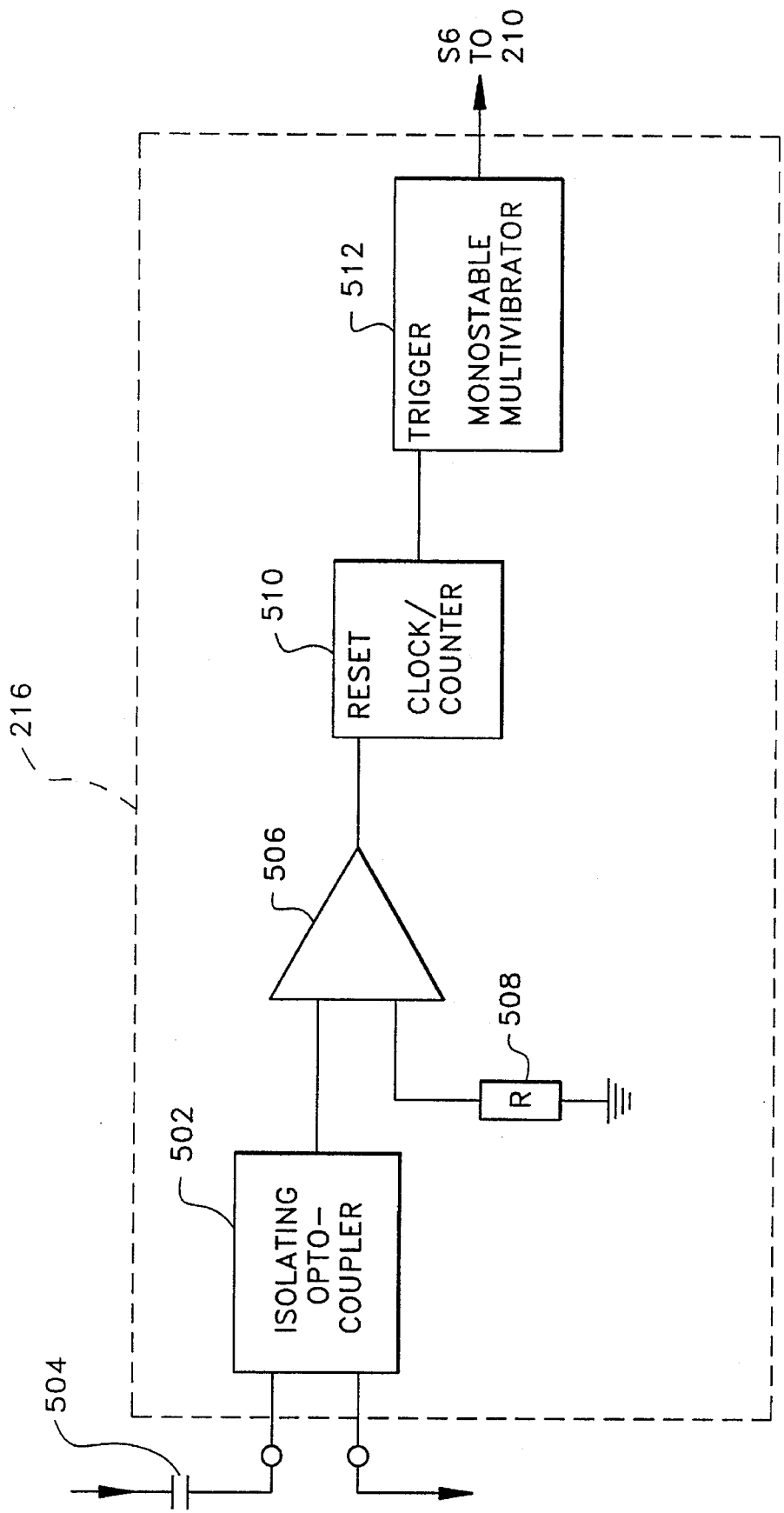
FIG. 5 is a functional block diagram of the single end feed section of the audio band interface module depicted in FIG. 2.

Referring now to FIG. 5, there is depicted a functional block diagram of the single end feed section 216. A set of circuit breaker auxiliary contacts 504, which provide an indication of the status (open or closed) of the circuit breaker with which they are associated, apply a voltage to an input of an isolating opto-coupler 502. The isolating optocoupler 502 is preferably a Hewlett Packard type HCPL-3700/60 Optocoupler. The output from the optocoupler 502 is a +V when contacts 504 are open; and becomes 0 V upon receipt of a voltage when the contacts 504 close.

The output of the isolating optocoupler 502 is coupled to the input of a comparator/level detector 506. In the preferred embodiment, the comparator/level detector 506 is a Motorola type LM139 Comparator. The output of the comparator/level detector 506 is coupled to a reset input of a binary counter 510. The binary counter 510 is preferably a Texas Instrument type SN54HC 4060 Asynchronous Binary Counter. The Q output of the binary counter 510 is coupled to the trigger input of a monostable multivibrator 512. The monostable multivibrator 512 is preferably a National Semiconductor type MM54HC123A Retriggerable Monostable Multivibrator.

Since the input to the comparator/level detector 506 transitions from a plus voltage to ground upon closure of contacts 504 as the result of a direct transfer trip, the output of the comparator/level detector 506 also transitions from high to low upon detection of a fault. This signal, applied to the reset input of the binary counter 510, causes the counter 510 to begin counting upon detection of a direct transfer trip. The Q output of the counter 510 transitions from low to high at a predetermined interval after the input transitions from high to low. Consequently, the Q output of the counter 510 will transition from low to high at a predetermined time after the contacts 504 close.

A transition of the signal at the trigger input of the monostable multivibrator 512 from low to high will cause an output at the Q terminal of the multivibrator 512. Consequently, an output signal S6, as depicted in exemplary form in FIG. 18F, will appear at the Q terminal of the monostable multivibrator 512 at a predetermined time following the opening or closing of the circuit breaker with which the contacts 504 are associated. The predetermined time period is adjusted to cause a delay in the transition of the S6 signal from a low voltage state (e.g. 0 volts) to a high voltage state (e.g. +5 volts) following closure of the contacts 504 to prevent spurious signals such as voltage spikes from erroneously initiating operation of the fault detection portion of the audio bandwidth module of the present invention. The signal S6 is coupled to the phase transmit circuit 210 as previously described.

Figure 19A:
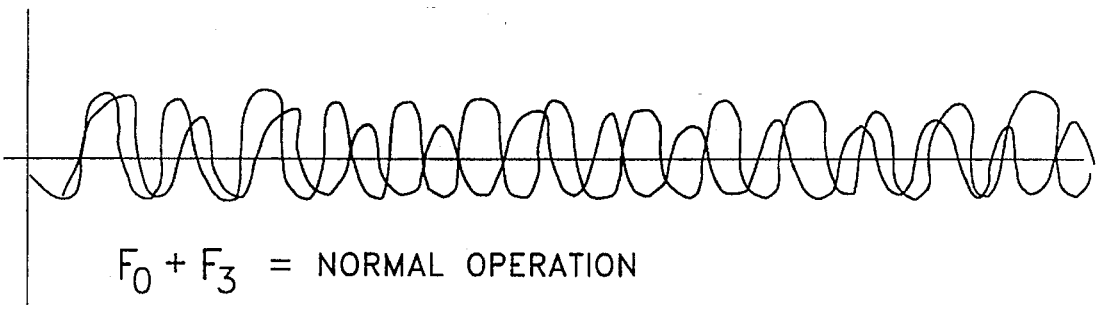
FIGS. 19A through 19C depict exemplary composite waveforms of the signal S7 output from the phase transmit circuit of the present invention as a result of differing sets of assumed circumstances which cause the application of differing sets of input signals to the audio bandwidth module of the present invention.
Figure 19B:
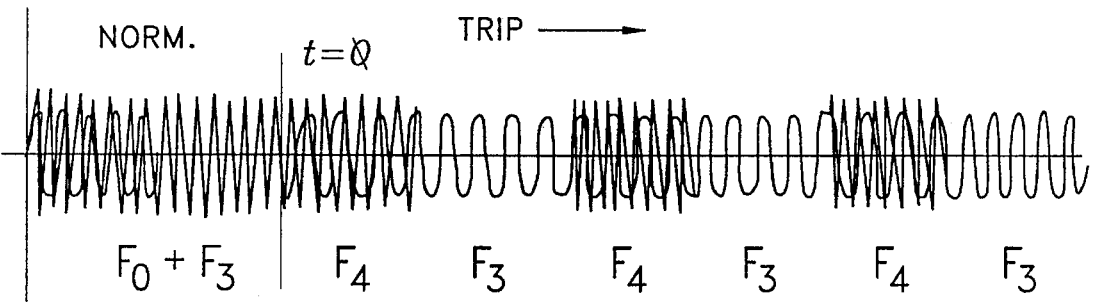
Figure 19C:
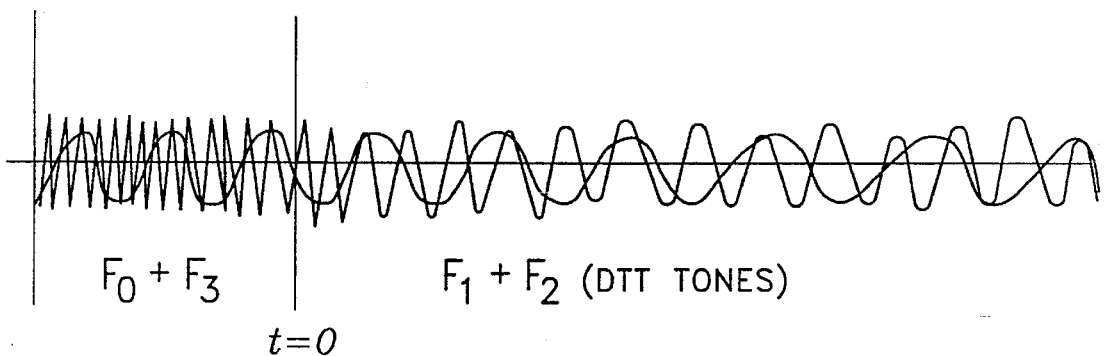

Referring again to FIG. 8, the phase transmit circuit operates as follows. The output signal from the summing amplifier 816 is a composite signal S7 having waveforms as depicted in exemplary form in FIGS. 19A through 19C. The makeup of the composite waveform S7 depends upon signals received by the audio bandwidth interface module as will be subsequently described. For example, assume a no-fault situation in which the voltage $V_f$ from the pilot wire relay is zero and the contacts 604 operated by the utility and the circuit breaker auxiliary contacts 504 are open resulting in no voltage being applied to the inputs of the direct transfer trip section 226 and the single end feed section 216 respectively.

In accordance with this assumed set of circumstances, the signal S4 from the fault detector section 214, which is applied to the control inputs of analog switches 802 and 806 as well as to the summing amplifier 816 is zero. Consequently, the switch contacts of analog switch 802 remain open; and the switch contacts of analog switch 806 remain closed. This prevents the signal S3 from the pilot signal processing section 206 from being applied to the control inputs of analog switches 804 and 808 while enabling the frequency $f_0$ to remain applied to the summing amplifier 816. Since there is no signal applied to the control inputs of analog switches 804 and 808, application of the frequency $f_4$ to the summing amplifier 816 is prevented; while the frequency $f_3$ remains applied to the summing amplifier 816. In addition, the signals S5 and S6 from the direct transfer trip and single end feed sections 226 and 216 respectively are also zero under this assumed set of circumstances. Consequently, there is no signal applied to the control inputs of the analog switches 810 and 812 thereby preventing the frequencies $f_1$ and $f_2$ from being applied to the summing amplifier 816. Consequently, the signal S7 output from the summing amplifier 816 takes the form as exemplified in FIG. 19A.

Now assume another set of circumstances in which a fault is detected by the pilot wire relay at time t=0. In this situation, the signal $V_f$ changes from 0 volts to a positive voltage at time t=0. This will cause the output signal S4 from the fault detector section 214 to transition from a low voltage (e.g. 0 volts) to a high voltage (e.g. +5 volts) at a predetermined time t=$t_p$ after receipt of the signal $V_f$ from the pilot wire relay at time t=0. Since this signal is applied to the control inputs of the analog switches 802 and 806, the contacts of switch 802 will close; and the contacts of switch 806 will open. Closure of the contacts of the analog switch 802 will cause the signal S3 from the pilot signal processing section 206 to be applied to the control inputs of analog switches 804 and 808.

Figure 18C:
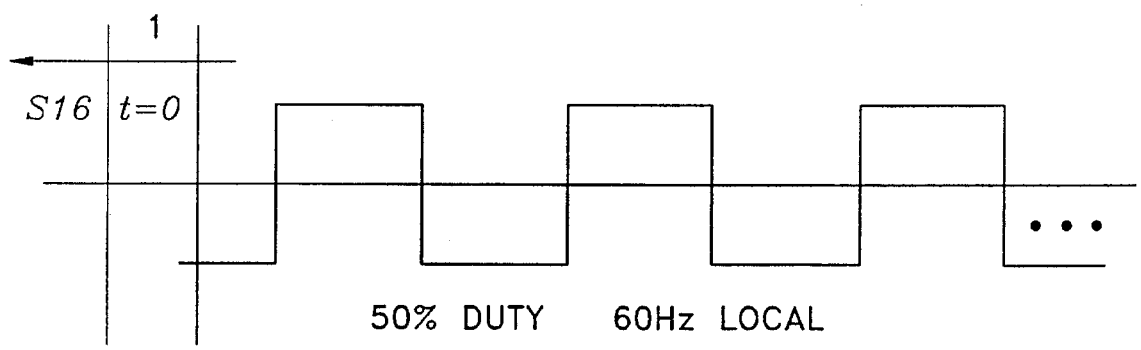
Figure 18D:
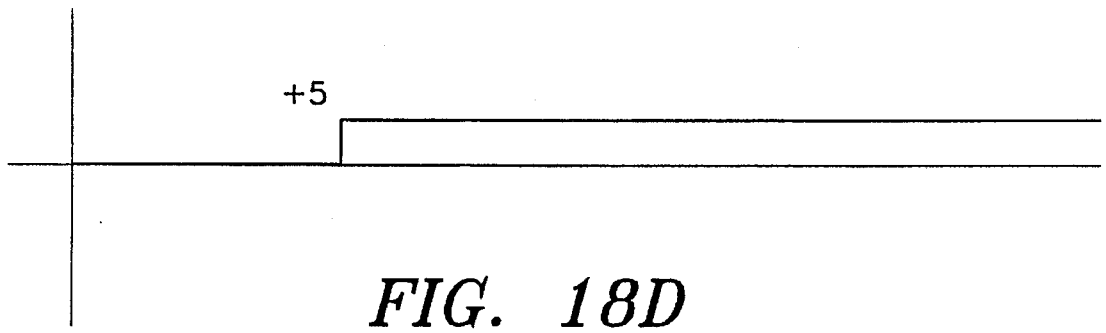
Figure 18E:
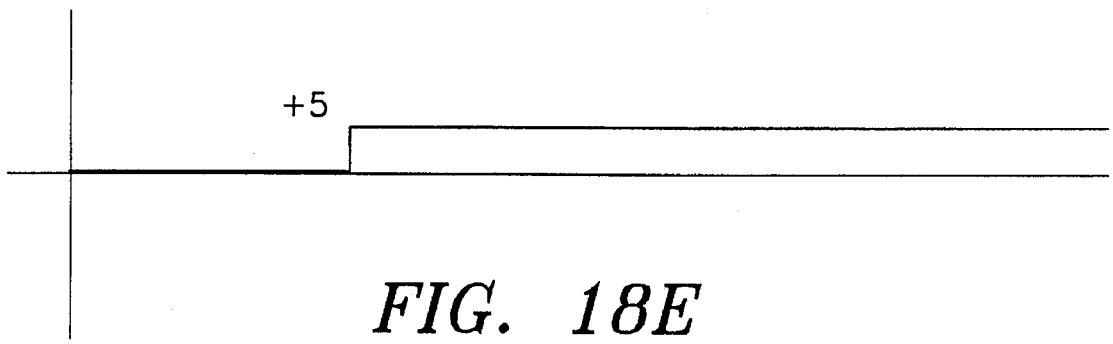
Figure 18F:
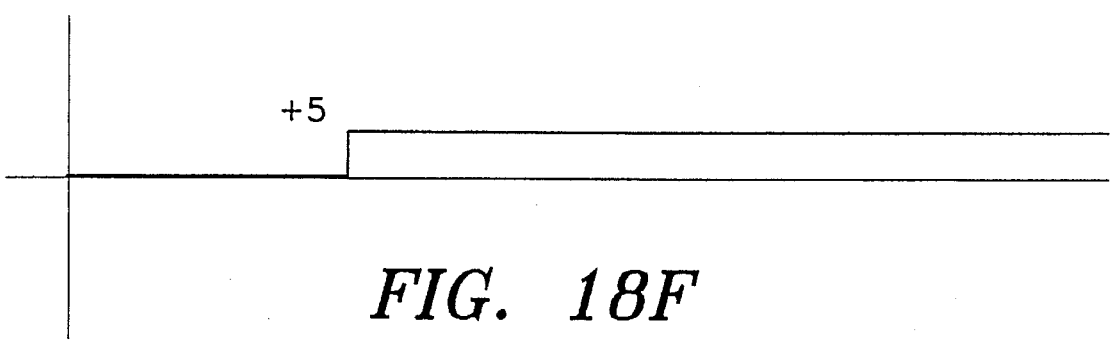

As previously described, the signal S3, depicted in exemplary form in FIG. 18C, is a square wave representative of a phase voltage at one end of the protected portion of the electrical power distribution line. Consequently, the contacts of analog switches 804 and 808 will close and open, and open and close respectively during the positive half-cycles of the signal S3 thereby applying the signals with the frequency $f_4$ during the positive half-cycle of the signal S3, and the frequency $f_3$ during the negative half-cycle to the summing amplifier 816. Furthermore, since the signal S4 is also applied to the control input of the analog switch 806, the contacts of switch 806 will open at time $t=t_p$ thereby causing the removal of the signal having frequency $f_0$ from the summing amplifier 816.

Also, since, under this assumed set of circumstances, the contacts 504 and 604 of the single end feed and direct transfer trip sections 216 and 226 respectively remain open, there is no change in the state of the contacts of analog switches 810 and 812 from that previously described. Therefore, the composite signal S7 output from summing amplifier 816 will take the form as exemplified in FIG. 19B. As can be seen from FIG. 19B, the composite signal S7 comprises a signal having frequencies $f_0+f_3$ until time $t=t_p$, at which time the composite signal changes to a signal comprising frequency $f_4$ which occurs for the duration of, and in phase with the positive portions of the signal S3, and frequency $f_3$ which occurs for the duration of, and in phase with the negative portions of the signal S3.

Now assume yet another circumstance where the utility initiates a direct transfer trip at time t=0. In this situation, the contacts 604 will close thereby applying a voltage +V to the direct transfer trip section 226 at time t=0. This will cause the output signal S5 from the direct transfer trip section 226 to transition from a low voltage (e.g. 0 volts) to a high voltage (e.g. +5 volts) at a predetermined time $t=t_p$ after the initiation of the direct transfer trip at time t=0. Since this signal is applied to the control inputs of the analog switches 810 and 812, the contacts of switches 810 and 812 will close. Closure of the contacts of the analog switch 810 will cause the signal having frequency $f_1$ to be applied to summing amplifier 816. Closure of the contacts of the analog switch 812 will cause the signal having frequency $f_2$ to be applied to summing amplifier 816. Therefore, the composite signal S7 output from summing amplifier 816 will take the form as exemplified in FIG. 19C. As can be seen from FIG. 19C, the composite signal S7 comprises a signal having frequencies $f_0+f_3$ until time $t=t_p$, at which time the composite signal changes to a signal comprising frequencies $f_1+f_2$.

Figure 18G:
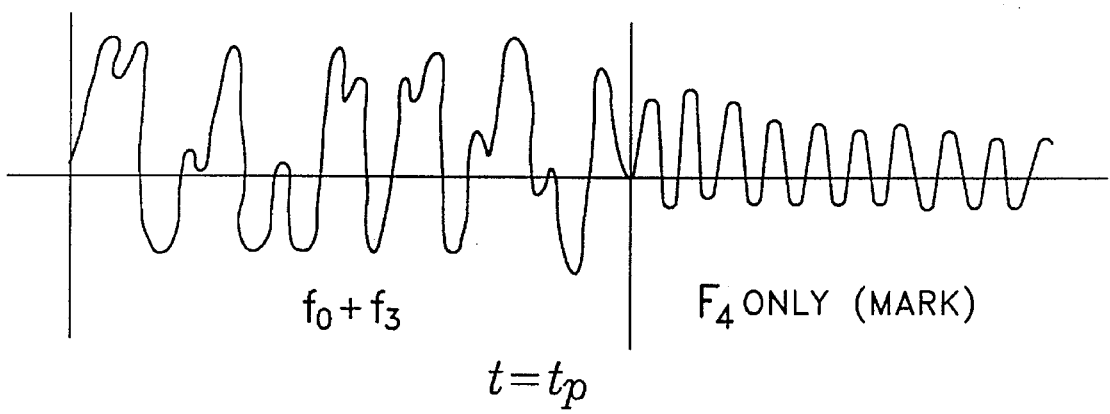

Now consider the single end feed situation where the auxiliary contacts 504 of a circuit breaker close at time t=0 indicating that the associated circuit breaker has changed status; i.e. has either opened or closed at t=0. In this situation, a voltage +V will be applied to the single end feed section 216. The single end feed section 216 will then operate in a manner similar to that previously described for the direct transfer trip section 226. As a result, the composite signal S7, in this situation, will comprise a signal having frequencies $f_0+f_3$ until time $t=t_p$, at which time the composite signal S7 changes to a signal comprising frequency $f_4$ as shown in FIG. 18G.

Figure 9:
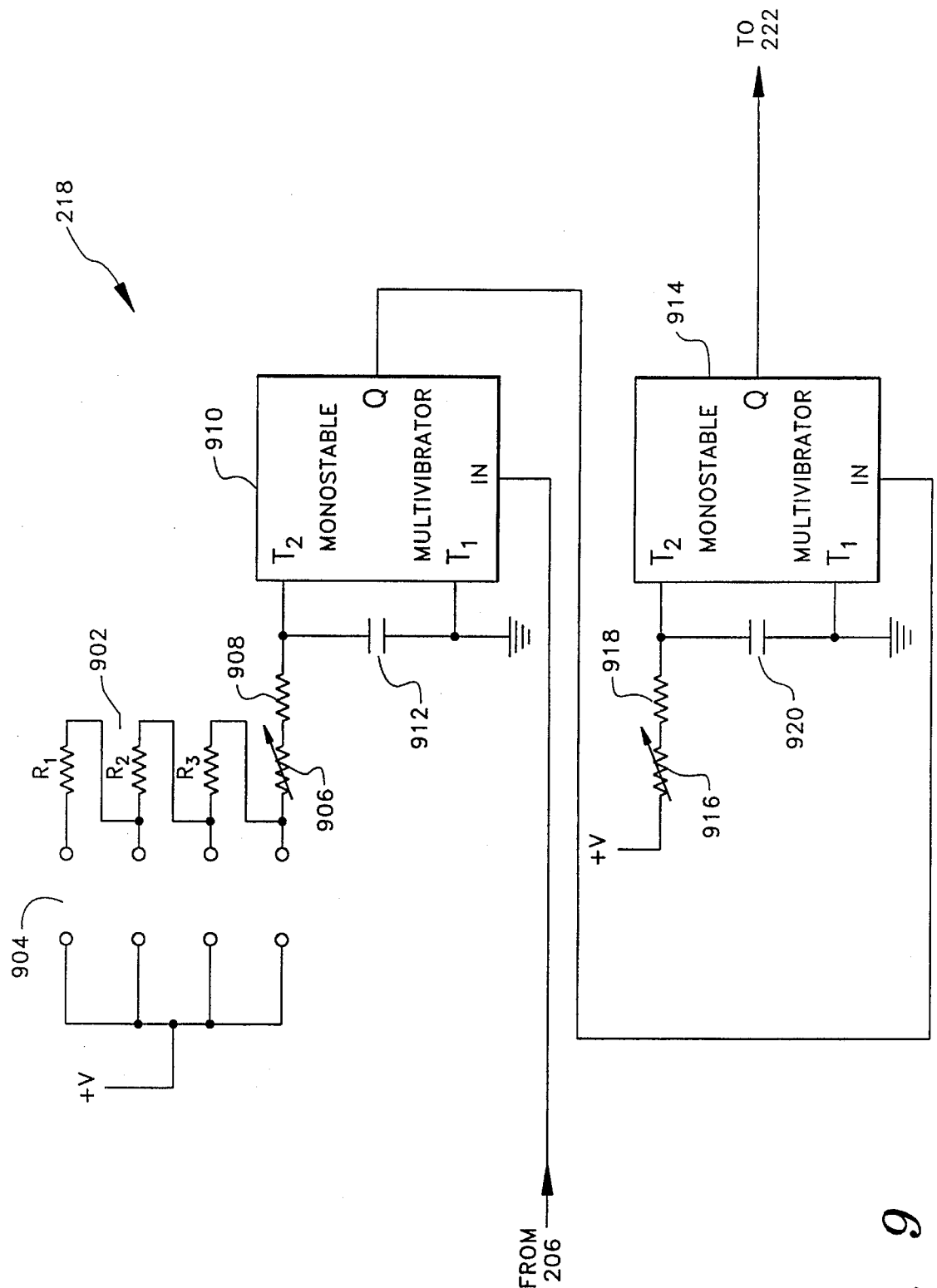
FIG. 9 is a functional block diagram of the local delay section of the audio band interface module depicted in FIG. 2.

As previously stated, the square wave output from the monostable multivibrator 720 of the pilot signal processing section 206 is coupled to the local delay section 218. Referring to FIG. 9, there is shown a functional block diagram of the local delay section 218. The square wave signal from the pilot signal processing section 206 is coupled to an input terminal (IN) of a first monostable multivibrator 910. A voltage (+V) is coupled to a resistive ladder network 902 through jumper contacts 904.

The end of the resistive ladder network 902 is coupled to an RC circuit comprising an adjustable resistor 906, a resistor 908 and a capacitor 912 which in turn is coupled to the $T_2$ and $T_1$ inputs of the first monostable multivibrator 910. The Q output of the monostable multivibrator 910 is coupled to an input terminal (IN) of a second monostable multivibrator 914. The voltage (+V) is coupled to a second RC circuit comprising an adjustable resistor 916, a resistor 918 and a capacitor 920 which are connected to $T_2$ and $T_1$ inputs of a second monostable multivibrator 914. In the preferred embodiment, the first 910 and second 914 monostable multivibrators are National Semiconductor type CD4538B. The RC circuits connected to the T1 and T2 inputs of the monostable multivibrators are used to adjust pulse duration and accuracy of the output pulses from the Q terminals of each monostable multivibrators. The output from the Q terminal of the second monostable multivibrator 914 is coupled to the phase function section 222.

The local delay section 218 is used to impart a delay in the local signal, which delay is substantially equal to the delay experienced by the signal being transmitted from the remote audio bandwidth interface module. As a result, the phases of the remote signal and local signal can be accurately compared without error which would be introduced by delay in transmitting the remote signal from the remote audio bandwidth interface module to the local audio bandwidth interface module. This delay is imparted as follows.

The square wave signal, representative of the phase voltage at the local end of the protected line is received from the pilot signal processing section 206 at the IN terminal of the first monostable 910. The first monostable multivibrator 910 will produce an output at the 0 terminal upon a positive transition of the input signal. The second monostable multivibrator 914 will produce a signal at the Q terminal upon a negative transition of the input signal. Accordingly, the signal output from the Q terminal of the second monostable multivibrator 914 can be delayed by adjusting the pulse-width of the signal output from the Q terminal of the first monostable multivibrator 910 using the first RC network coupled to the $T_2$ and $T_1$ terminals of the first monostable multivibrator 910. The second RC network coupled to the $T_2$ and $T_1$ terminals of the second monostable multivibrator 914 are used to adjust the duty cycle of the signal output from the Q terminal of the second monostable multivibrator 914 to 50% as required.

The signal from the pilot signal processing section 206 is a 60 Hz local square wave. Jumper contacts 904 are used to fix a predetermined amount of delay into the local delay section 218 by inserting more or less resistance into the timing circuit comprising the resistive ladder 902, the adjustable resister 906, the resistor 908 and the capacitor 912. A greater resistance selected by the jumper contacts 904 will produce a longer pulse from the Q output of the first monostable multivibrator 910. A smaller resistance selected by the jumper contacts 904 will produce a smaller pulse from the 0 output of the first monostable multivibrator 910. The variable resistor 906 enables the fine tuning of the width of the pulse signal from the Q output of the first monostable multivibrator 910.

The local square wave signal from the pilot signal processing section 206 applied to the IN terminal of the first monostable multivibrator 910 triggers an output from Q upon the occurrence of a low to high transition. At that time, the output signal from Q of the first monostable multivibrator 910 will change state from high to low. This signal is then applied to the IN terminal of the second monostable multivibrator 914. As previously stated, the greater the resistance in the input timing circuit, the longer the output from Q of the first monostable multivibrator 910 will remain low.

The signal from the Q output of the first monostable multivibrator 910 will trigger the output from Q of the second monostable multivibrator 914 upon occurrence of a low to high transition. Accordingly, a delay is transferred from the first monostable multivibrator 910 to the second monostable multivibrator 914 for the duration of the low pulse from the Q output of the first monostable multivibrator 910. This delay is adjusted to substantially equal the amount of delay in receiving the 60 Az square wave signal from the remote audio bandwidth interface module.

Figure 11:
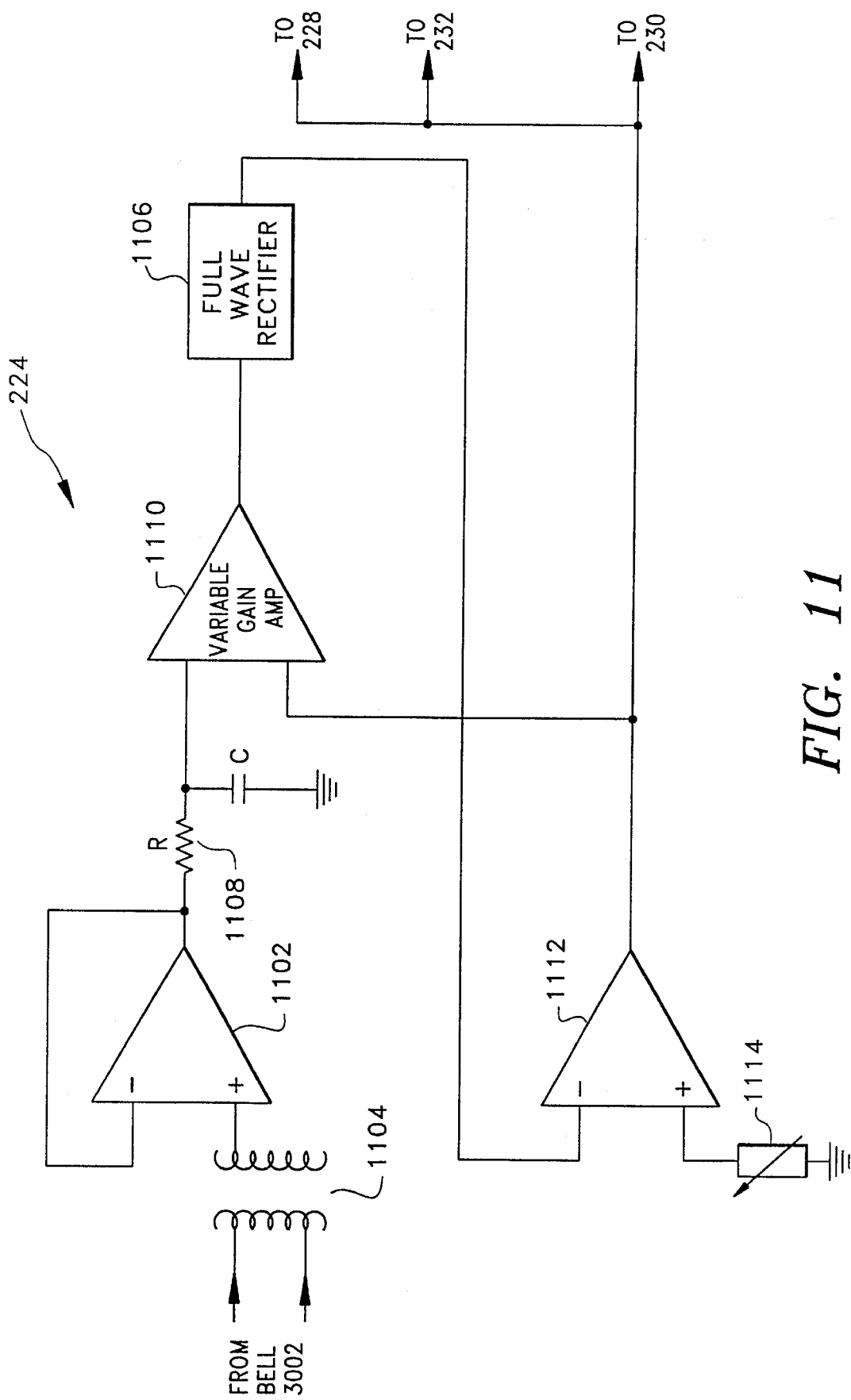
FIG. 11 is a functional block diagram of the receiver/AGC section of the audio band interface module depicted in FIG. 2.

Now referring to FIG. 11, there is shown a functional block diagram of the receiver/AGC section 224. The receiver/AGC section 224 includes a low loss, coupling, isolating transformer 1104. The secondary coil of the transformer 1104 is coupled to an input of a buffer amplifier 1102. The output of buffer amplifier 1102 is coupled to a full wave rectifier 1106 through RC filter network 1108. The output of the lull wave rectifier 1106 is coupled to an input of amplifier 1112. The output of amplifier 1112 is coupled the low pass filter 228, the band pass filter/decoder section 230 and the high pass filter/decoder section 232.

The signal from the Bell Telephone Series 3002 communications channel is coupled to the primary coil of the transformer 1104. The signal output from the secondary coil is then buffered by amplifier 1102 so that the signals can be sourced to the circuit that follows. The RC filter network 1108 provides source impedance and high frequency filtering to the signal before it is coupled to the full wave rectifier 1106. The output of the full wave rectifier 1106 is coupled to amplifier 1112 and is adjusted by adjustable resistor 1114 for level determination as the output of amplifier 1112 is fed directly back into the full wave rectifier 1106 for a voltage level comparison with the new input from the Series 3002 communications channel. Therefore, the full wave rectifier 1106, the amplifier 1112 and the adjustable resistor 1114 all cooperate to provide a constant signal level at the output of amplifier 1114, for example 100 mV, for an input signal of varying magnitude from the Bell Series 3002 communication channel.

Signals typically emerge from the Series 3002 communication channel at a power level which varies with the frequency of the signal. The Series 3002 communications channel tends to reject signals having low frequencies, typically below 300 Hz. And for signals at higher frequencies, for example frequencies approaching 3,000 Hz, the power loss increases substantially. Although the Series 3002 communication channel ideally has an output of −16 db+/−1 db across a bandwidth of 300 to 3,000 Hz for a 0 db input at the transmitter, in actuality, the power levels of the signals can change depending upon the situation of conditions (e.g. weather conditions, etc.). Accordingly, the signal strength can go as low as −24 db for problems that arise through natural conditions during storms and lightening. Consequently, the receiver/AGC section enhances the reliability of operation of the audio bandwidth interface module by maintaining a constant voltage level of the signals coupled to the high and band pass filter/decoders 232 and 230 and the low pass filter 228 despite change in the power level of the signals received from the Series 3002 communications channel.

Figure 14:
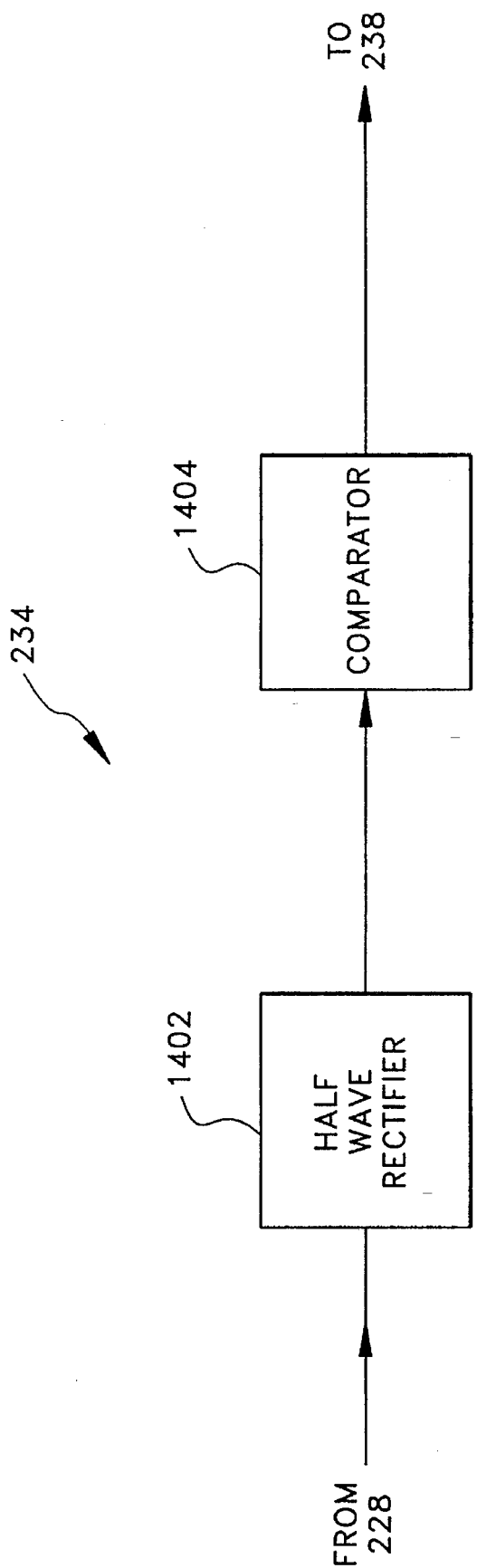
FIG. 14 is a functional block diagram of the noise function section of the audio band interface module depicted in FIG. 2.

As shown in FIG. 2, the output from the receiver/AGC section 224 is coupled to the inputs of a low pass filter 228, a band pass filter/decoder 230 and a high pass filter/decoder 232. The low pass filter filters out signals having frequencies higher than a predetermined limit. In the preferred embodiment, this predetermined limit is 700–800±25 Hz. The filtered output from the low pass filter is coupled to the input of the noise function section 234. Referring now to FIG. 14, there is depicted a functional block diagram of the noise function section 234.

The noise function section 234 comprises a half wave rectifier 1402, the output of which is coupled to the input of a comparator 1404. The half wave rectifier 1402 rectifies the filtered signal from the low pass filter 228. The rectified signal from the half wave rectifier 1402 is compared to a predetermined limited by comparator 1404. The purpose of the noise function section 234 is to determine if the receiver is being exposed to an unstable amount of noise. The noise source will be directly from the telecommunication channel. The greater the noise, the greater the chance of false operation.

Although there is usually some noise present in the signal, the noise function section 234 will provide a signal upon detection of excessive noise which exceeds the predetermined limit. The noise function section 234 measures the lowest portion of the channel that is governed by the low pass filter 228. If the lower end of the telecommunication line has an unwanted signal (that is, the line should contain nothing in this region of operation for any mode of operation), then the noise function section 234 will detect the presence of such signal and provide an output signal to the input/output section 238. The input/output section 238 then displays a warning alarm to alert the user that excess noise is present.

Figure 12:
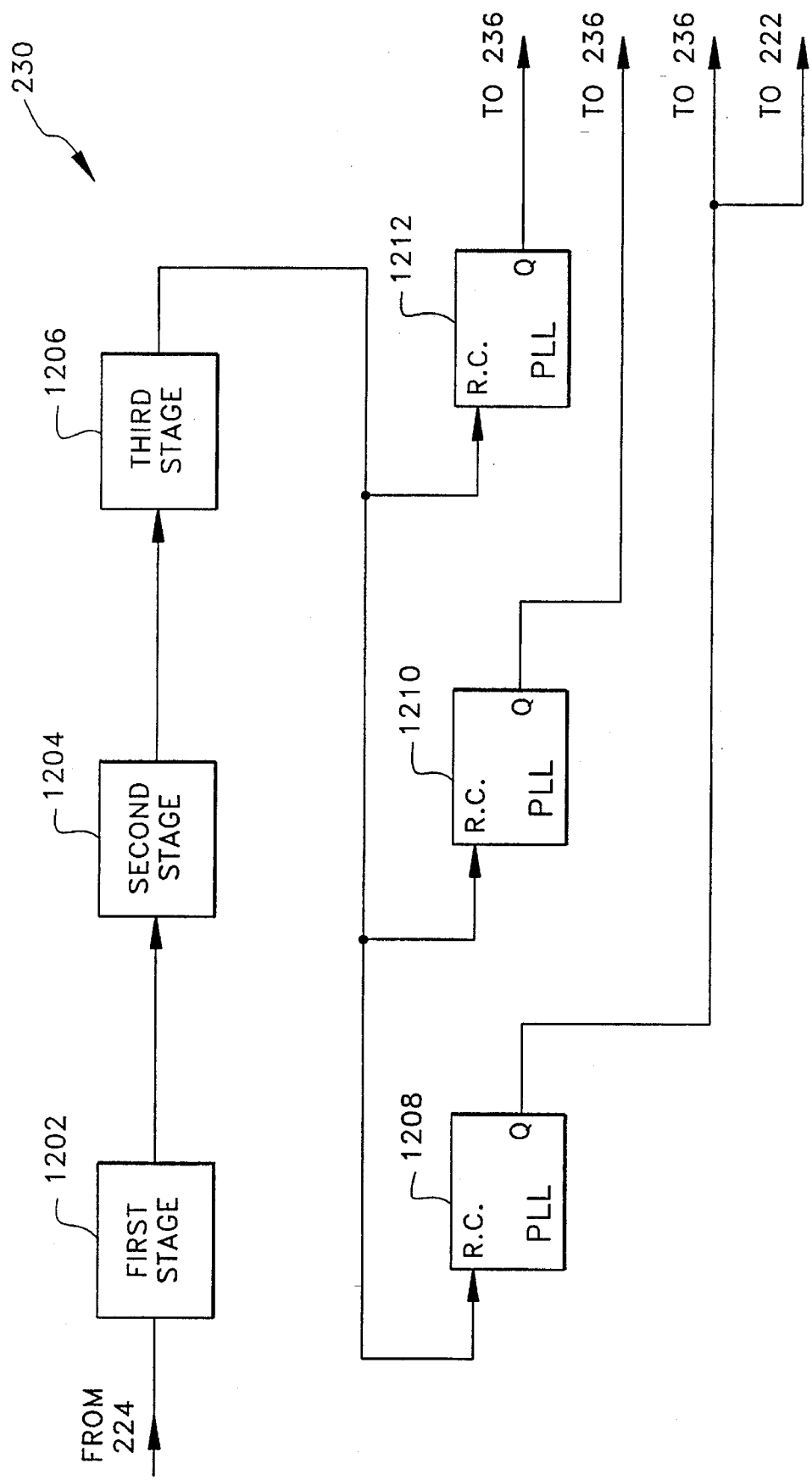
FIG. 12 is a functional block diagram of the band pass filter/decoder of the audio band interface module depicted in FIG. 2.

Referring now to FIG. 12, there is depicted a functional block diagram of the bandpass filter/decoder 230. The signal from the receiver/AGC 224 is coupled to the input of a first stage 1202. The output of the first stage 1202 is coupled to the input of a second stage 1204. The output of the second stage 1204 is coupled to the input of a third stage 1206. The output of the third stage 1206 is coupled to the $R_1$ $C_1$ inputs of a first 1208, second 1210 and third 1212 phase locked loop tone detectors. These tone detectors are preferably National Semiconductor type NE567. The Q output of each of the tone detector 1208, 1210 and 1212 are coupled to inputs of the DTT function section 236. In addition, the Q output of the tone detector 1208 is coupled to an input of the phase function section 222.

The first 1202, second 1204 and third 1206 stages are active components which comprise a 6 pole band pass filter network. Each stage comprises 2 poles of the hand pass filter network. The band pass is preferably in the range of 1,000 Hz to 1,750 Hz. All other frequencies will not pass through the band pass filter. The frequency of interest here is $f_0$ (1,040 Hz) which is the phase guard tone. In addition, both direct transfer trip tone $f_1$ (1,341 Hz) and $f_2$ (1,638 Hz) will also be passed through the band pass filter. After passing through the band pass filter portion, each tone will then enter a tone detector tuned to its particular frequency. For example the signal having frequency $f_0$ will enter phase tone detector 1208; the signal having frequency $f_1$ will enter phase tone detector 1210; and the signal having frequency $f_2$ will enter phase tone detector 1212. Each of these phase tone detectors is set to lock onto the frequency of its associated tone. In normal operation, the output Q of each tone detector is low for a tone which is not present and high for a tone which has been locked on by the phase locked loop.

Figure 13:
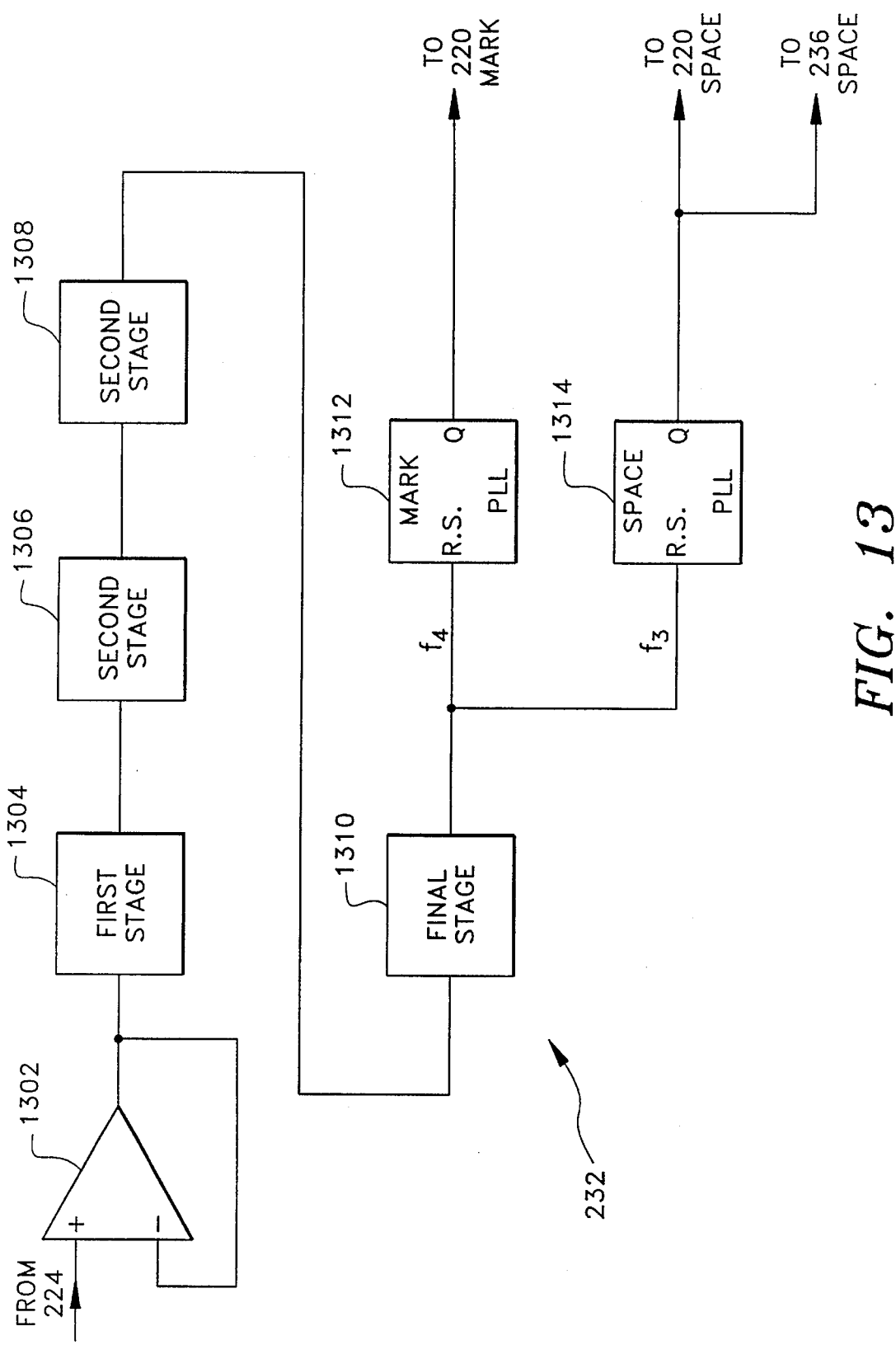
FIG. 13 is a functional block diagram of the high pass filter/decoder of the audio band interface module depicted in FIG. 2.

As previously described, the tones enter the band pass filter/decoder section 230 after being clipped and sent through a full wave bridge rectifier to make all parts of the sign wave positive since the tone detectors do not respond to a negative voltage signal. Upon receipt and lock by the tone detectors 1208, 1210 and 1212, the corresponding information from their respective Q outputs is coupled to inputs of the DTT function section 236 and the phase function section 222 for further processing and decision making capability as will be subsequently described. As can be seen from the above description, the principal function of the band pass filter/decoder section 230 is to decode and verify the existence of audio tones. It also removes most of the noise from the tones themselves. Referring now to FIG. 13, there is depicted a functional block diagram of the high pass filter/decoder section 232. The signal from the receiver/AGC section 224 is coupled to an input of a buffer amplifier 1302. The output of the buffer amplifier 1302 is coupled to the first stage 1304 of a two pole filter. The output of the first stage 1304 is coupled to a second stage 1306 of the two pole filter. The output of the second stage 1306 is coupled to a third stage 1308 of the two pole filter. The output of the third stage 1308 is coupled to the input of a final stage 1310 of the two pole filter. The high pass filter/decoder 232 operates substantially the same as the band pass filter/decoder 230 except that the four stage two pole filter passes only those frequencies which exceed 1900 Hz.

The output of the final stage 1310 of the two pole filter will be the signals having frequencies $f_3$ (1,970 Hz) and $f_4$ (2,470 Hz). Each of these tones is coupled to the $R_1$ $C_1$ inputs of phase locked loop tone detectors 1312 and 1314 which the $f_3$ tone entering the tone detector 1314 and the $f_4$ tone entering the tone detector 1312. For normal operation, the Q signal output from each tone detector is low for a tone not present and high for a tone locked on by that tone detector. The Q output signal $f_4$ from the tone detector 1312 which is tuned to the tone $f_4$, is coupled to an input of the remote reconstruction section 220. The Q output of the tone detector 1314 $f_3$, which is tuned to the tone $f_3$, is coupled to an input of the remote reconstruction section 220 and to an input of the DTT function section 236. As can be seen from the above description, the principal function of the high pass filter/decoder section 232 is to decode and verify existence of the higher frequency audio tones $f_3$ and $f_4$. This section also removes most of the noise from the tones themselves.

Figure 15:
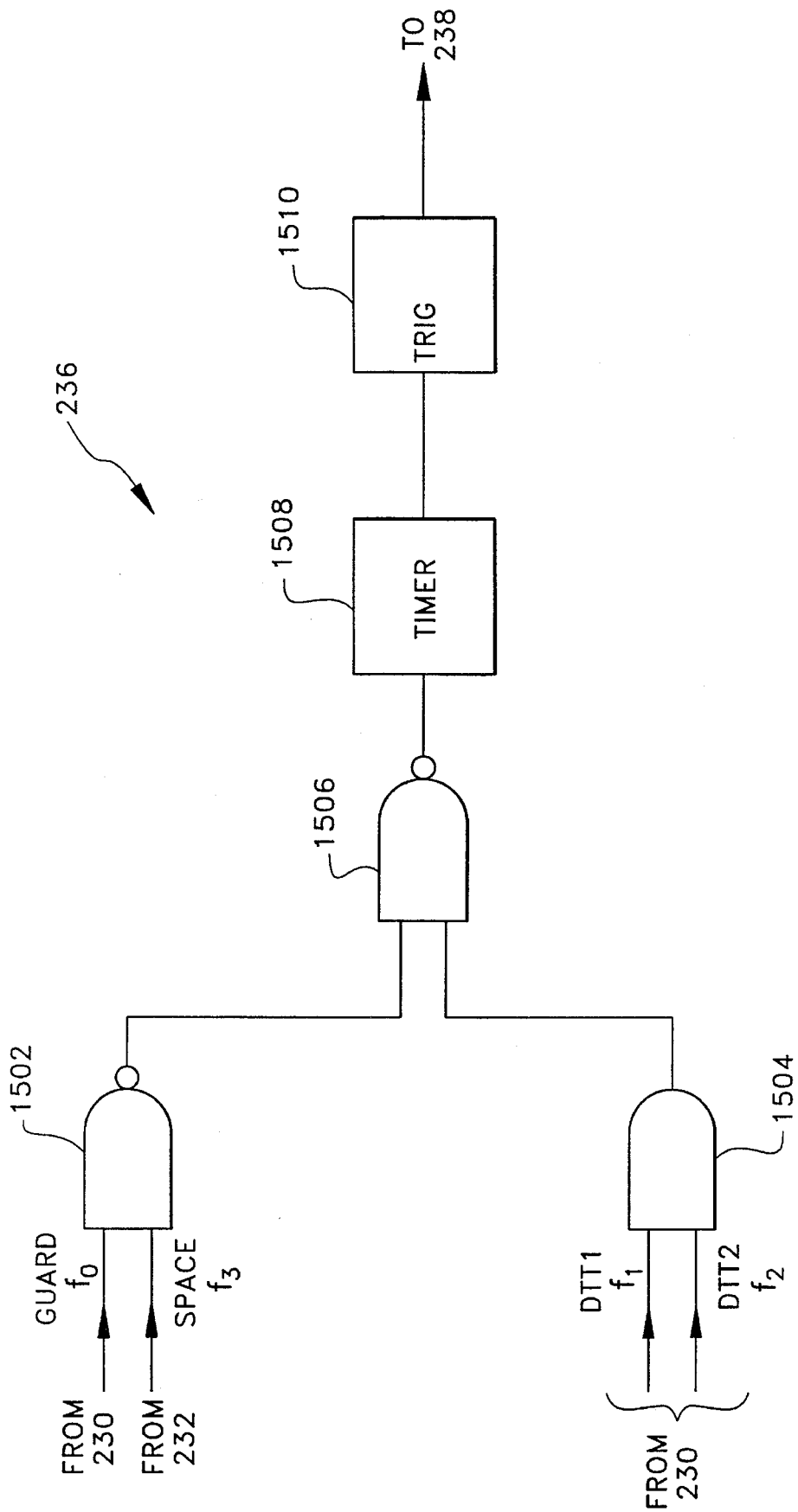
FIG. 15 is a functional block diagram of the DTT function section of the audio band interface module depicted in FIG. 2.

Referring now to FIG. 15, there is depicted a functional block diagram of the DTT function section 236. The guard $f_0$ signal from the band pass filter/decoder section 230 is coupled to one input of a first two input NAND gate 1502. The space $f_3$ signal from the high pass filter/decoder section 232 is coupled to the other input of the NAND gate 1502. The output of the first NAND gate 1502 is coupled to one input of a second NAND gate 1506. The DTT1 $f_1$ signal from the bandpass filter/decoder 230 is coupled to one input of a two input AND gate 1504. The DTT2 $f_2$ signal from the band pass filter/decoder section 230 is coupled to the other input of the two input AND gate 1504. The output of the NAND gate 1504 is coupled to the other input of the second two input NAND gate 1506. The output of the second NAND gate 1506 is coupled to the input of a timer 1508. The output of the timer 1508 is coupled to the trigger input of a monostable multivibrator 1510. In the preferred embodiment, the first and second NAND gates 1502 and 1506 are type 74HC00 manufactured by Motorola; and the AND gate 1504 is a type 74HC08 manufactured by Motorola. The timer 1508 is preferably a Texas Instrument types HC4060 asynchronous 14-state binary counter and oscillator; and the monostable multivibrator is preferably a National Semiconductor type HC123A dual retriggerable monastable multivibrator.

The DDT function section 236 operates as follows. Under normal operation, $f_0$ and $f_3$ are logical ones. Consequently, the output of the first NAND gate 1502 is a logical zero. Also under normal conditions, the signals $f_1$ and $f_2$ are zeros. Consequently, the output of the AND gate 1504 is also a logical zero. Since these signals are applied to the input of the second NAND gate 1506, the output of the second NAND gate 1506 is a logical one. This logical one applied to the timer 1508 keeps the timer in a reset condition. Consequently, no signals are applied to the monostable multivibrator 1510 causing the output to 238 to be a logical zero. Upon receiving a direct transfer trip signal from the remote audio interface module through the receiver/AGC section 224 and the band pass filter/decoder 230 and high pass filter/decoder 232, the $f_0$ and $f_3$ signals will become logical zeros while the small $f_1$ and $f_2$ signals will become logical ones. Consequently, the output of the first NAND gate 1502 will become a logical one while the output of the AND gate 1504 will also be one. Consequently, the output of the second NAND gate 1506 will be a logical zero. This enables the timer 1508 to begin counting thereby producing an output pulse which triggers the monostable multivibrator 1510. The output from the monostable multivibrator 1510 thereby transitions from low to high causing the illumination of an LED and a contact closure in the input-output section 238 as will be subsequently described.

Figure 16:
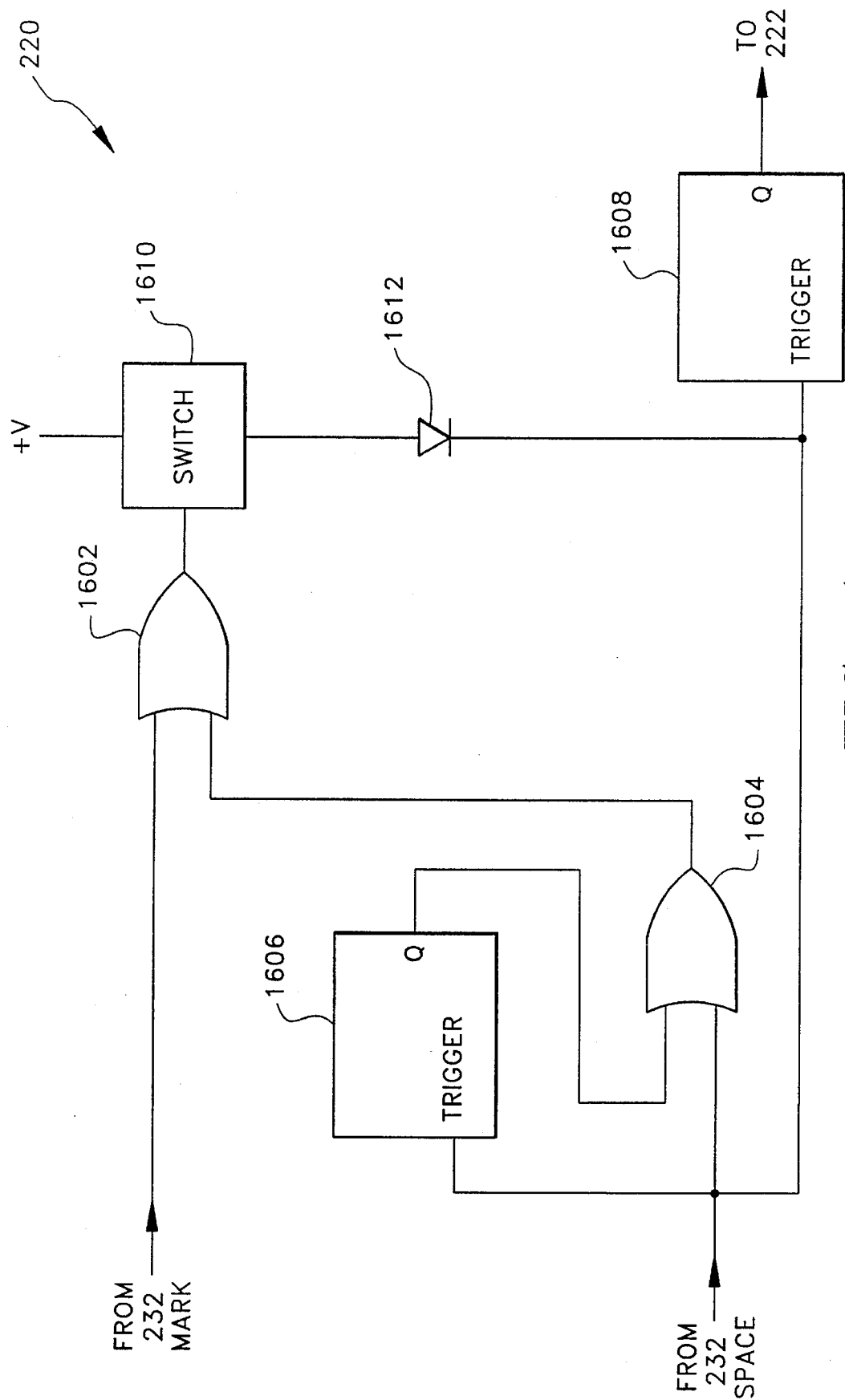
FIG. 16 is a functional block diagram of the remote reconstruction section of the audio band interface module depicted in FIG. 2.

Referring now to FIG. 16, there is depicted a functional block diagram of the remote reconstruction section 220. The marked signal from the high pass filter/decoder 232 is coupled to one input of a first two input OR gate 1602. The output of the first OR gate 1602 is coupled to a control input of a switch 1610. The space signal from the high pass filter/decoder 232 is coupled to a trigger input of a first multivibrator 1606, one input of a second two input OR gate 1604 and a trigger input of a second multivibrator 1608. The Q output of the first multivibrator 1606 is coupled to the second input of the second two input OR gate 1604. The output of the second two input OR gate 1604 is coupled to the second input of the first two input OR gate 1602. A positive voltage +V is applied to one side of the switch contact of the switch 1610. The other side of the switch contact of the switch 1610 is coupled to the anode of a diode 1612. The cathode of the diode 1612 is coupled to the trigger input of the second multivibrator 1608. The Q input of the second multivibrator 1608 is coupled to an input of the phase function section 222. In the preferred embodiment, the multivibrators 1606 and 1608 are National Semiconductor type 123A dual retriggerable monastable multivibrators.

The remote reconstruction section 220 operates as follows. As previously described, the tone detectors of the high pass filter/decoder 232 provide a digital output for the presence of a valid tone which is either a logical "1" or "0" depending upon the presence of absence of the valid tone. In this case the tones represent the mark and space signals $f_4$ and $f_3$ respectively. These tone detection signals from the high pass filter/decoder section 232 are connected directly to the remote reconstruction section 220 with the intent of restructuring the information provided by each output. Each tone detector is responsible for detecting a tone and the phase locked loop is tuned to lock on to its associated tone. The tone detectors provide the logical high/low whenever the tone is present. Since the tones represent the Mark and Space signals, one tone detector will go low while the other is high. Although the presence of these signals should be mutually exclusive, it is sometimes difficult to distinguish when one tone begins and the other ends. Sometimes this results in chattering. Consequently, it is desirable to control this chattering that corresponds to the turning on-off of the detectors at a fast rate.

The space tone detector, which is connected directly to the remote reconstruction section 220 from the high pass filter/decoder section 232 will, for the purposes of this description, be used as the basis of the reconstruction since one must be chosen as a reference. It should be noted that the "mark" tone could also have been chosen as the reference.

The space $f_3$ signal from the high pass filter/decoder section 232 is coupled to one input of the OR gate 1604. Assuming the situation where the signal has not transitioned and therefore will not trigger the first multivibrator 1606, its Q output will be low. Consequently, both inputs to the second two input OR gate 1604 will be low and the output from the gate 1604 will also be low. The mark $f_4$ signal at this time will be high. Since the mark $f_4$ signal is coupled to one input of the first two input OR gate 1602, the output of the first gate 1602 will be high thereby turning the switch 1610 off and allowing the second multivibrator 1608 to be triggered by a new pulse when entered. This also causes the Q output from the second multivibrator 1608 to be low. It is preferred that an RC circuit is coupled to the time input of the second multivibrator 1608 in order to adjust the duty cycle of the Q output from the multivibrator 1608 to 50%.

The low to high transition of the space tone detector entering the remote reconstruction section 220 will trigger the input of the first multivibrator 1606. The rising edge will trigger a very short pulse to encompass the chatter that will occur at the tone detectors of the high pass filter/decoder 232. The pulse will last for a predetermined amount of time which will be longer than the chatter provided by the tone detectors of the high pass filter/decoder 232. The high pulse from the Q output of the first multivibrator 1606 enters the second OR gate 1604. The space $f_3$ signal will also be high now causing high signal to enter the first OR gate 1602 through the second OR gate 1604. The mark $f_4$ signal will be low and will enter the first OR gate 1602 in a low state. The switch 1610 will then be turned on and pull the signal high on a clean transition from low to high thus creating a clean square wave to enter the second multivibrator 1608 then on to the phase function section 222.

The same function occurs from a high to low transition. When the space $f_4$ signal goes from high to low, no trigger occurs at the first multivibrator 1606. The low space $f_4$ will enter the second OR gate 1604 causing the output from that gate to go low. The low output from the second gate 1604 will enter the first gate 1602. The mark $f_4$ signal will be high and turn the switch 1610 off whereby all signals remain low causing no trigger at the second multivibrator 1608 and allowing the Q output from the second multivibrator 1608 to time out and remain low when complete.

Figure 10:
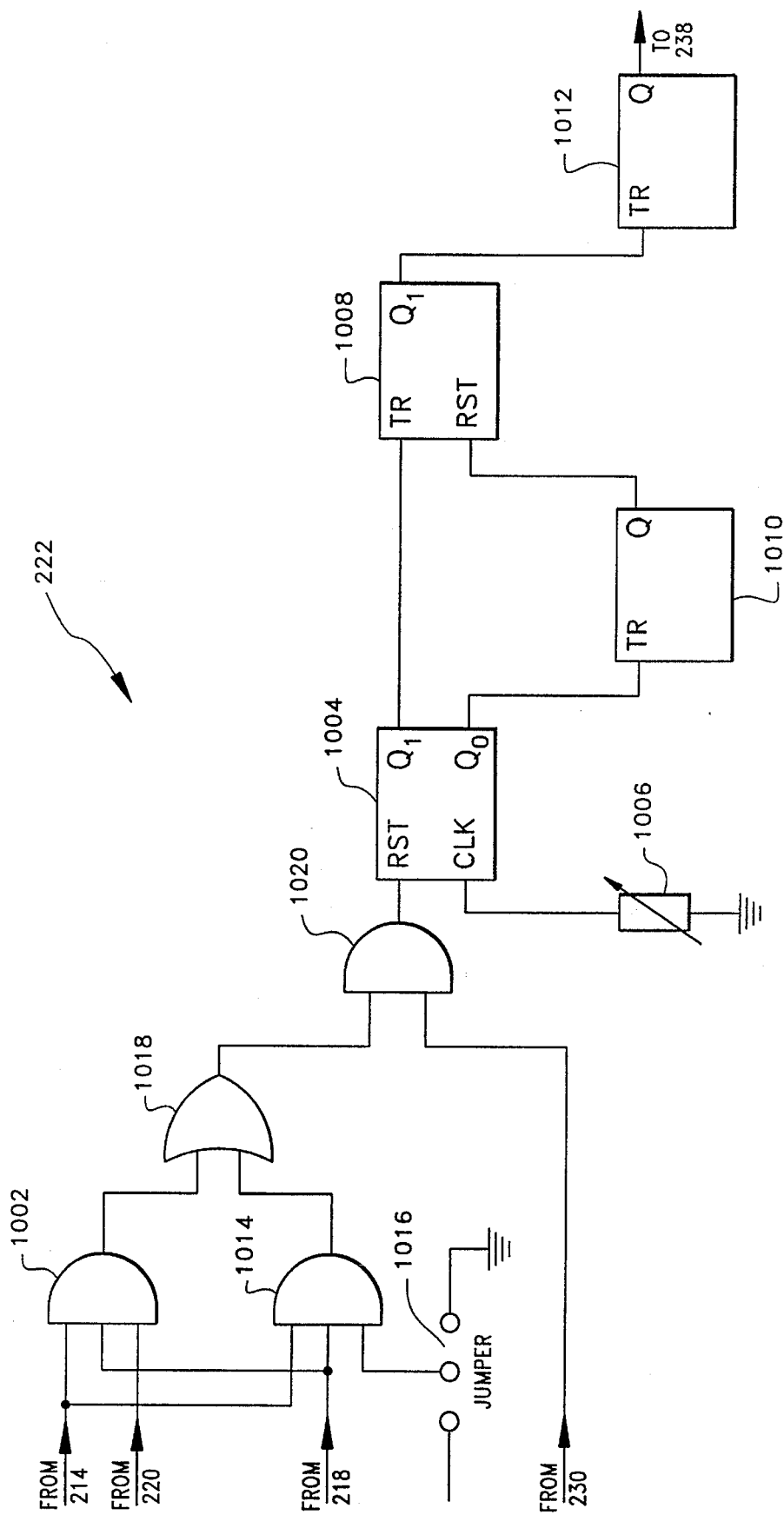
FIG. 10 is a functional block diagram of the phase function section of the audio band interface module depicted in FIG. 2.

Referring now to FIG. 10 there is depicted a functional block diagram of the phase function section 222. The signals from the fault detector section 214, the local delay section 218 and the remote reconstruction section 220 are each connected to an input of a first three input AND gate 1002. The signals from the fault detector section 214 and the local delay section 218 are each also coupled to an input of a second 3 input AND gate 1014. The third input of the second 3 input AND gate 1014 is connected to a jumper which can connect that input from either a source of a high signal or a source of a low signal (ground). The output of the first 3 input AND gate is connected to one input of a 2 input OR gate 1018. The output of the second 3 input AND gate 1014 is connected to the second input of the 2 input AND gate 1018. The output of the two input OR gate 1018 is coupled to one input of a 2 input AND gate 1020. The $f_0$ guard signal from the band pass filter/decoder 230 is coupled to the second input of the 2 input AND gate 1020. The output of the 2 input AND gate 1020 is coupled to the reset input of a first counting oscillator 1004. The first oscillator 1004 is preferably a Texas Instrument type HC4060 asynchronous 14-stage binary counter and oscillator. A variable resistor 1006 is connected between the clock input of the first oscillator 1004 and ground. The $Q_1$ output of the first oscillator 1004 is coupled to a trigger input of a first binary counter 1008. The $Q_1$ output of the first binary counter 1008 is coupled to the trigger input of a second monostable multivibrator 1012. The Q output of the second monostable multivibrator 1012 is coupled to the input/output section 238. The $Q_0$ output of the oscillator 1004 is coupled to a trigger input of a third monostable multivibrator 1010. The Q output of the third monostable multivibrator 1010 is coupled to the reset input of the first multivibrator 1008. The second and third multivibrators are preferably National Semiconductor type HC123A dual retriggerable monostable multivibrators. The first binary counter 1008 is preferably a Motorola type 4516 binary counter. The phase function section 222 is primarily responsible for determining if a trip situation has occurred. A trip situation is the existence of a valid internal fault. That is, a fault which occurs within the protective zone of the electrical power distribution system. During an internal fault, the local and remote square waves are in phase. The signals preferably must have a corresponding relationship of at least 90° or 4⅙ milliseconds, or a phase angle of 90°. For reliability, it is preferred that this event occurs on two consecutive cycles. Upon such occurrence, there will be a resultant logical one output signalled to the input/output section 238 from the Q output of the second multivibrator 1012. The signal provided will be responsible for energizing trip output relay contacts in the protective relaying system as well as providing a trip alarm in the input/output section 238. Consequently, the output signal Q from the second multivibrator 1012 is high for a trip condition and is low for a no trip situation.

As previously described, the local pilot relay signal, in square wave form, which has been delayed by the local delay section 218, is coupled to an input of the first 3 input AND gate 1002 and an input of the second 3 input AND gate 1014. The remote pilot relay signal, which has been transmitted from the remote audio bandwidth interface module via the telecommunication channel, and which is reconstructed by the remote reconstruction section 220, is coupled to a second input of the first 3 input AND gate 1002. Both of these signals are required to perform the phase comparison function except upon occurrence of a single-end feed situation or upon selection of a trip versus block configuration.

A guard signal, designated $f_0$ in this detailed description, is coupled from the band pass filter/decoder section 230 to one input of the 2 input AND gate 1020. As described with respect to the band pass filter/decoder section 230, the information provided by the guard signal is whether or not the $f_0$ signal is present. If the $f_0$ guard signal is present, a logical 1 is received at the input of the 2 input AND gate 1020. If it is not present, a logical 0 is received at that input of the two input AND gate 1020.

A trip signal will occur if both the local signal from the local delay section 218 and the remote signal from the remote reconstruction section 220 are present and in phase for at least two consecutive cycles and if the guard signal $f_0$ is not present.

If all these conditions are met for at least two consecutive cycles, then a valid trip output will be signalled from the Q output of the second multivibrator 1012 to the input-output section 238 and this signal will also be used to trip the relay protecting the electrical power distribution system at that location.

For a fault which is internal to the protected zone, both the local and remote signals are in phase as previously described. If these squarewaves are in phase for a minimum time of 90° which phase angle is adjusted by the adjustable resistor 1006, the reset of the counter 1004 is triggered to allow the counter to count. If the squarewaves are in such a state the resultant output pulse will be sent to the first multivibrator (binary counter 1008). The counter 1008 is responsible for counting every pulse and checking to see if there are two consecutive pulses. As the second cycle is analyzed by the counter 1004 and is found to be in phase, a second pulse is sent from the counter 1004 to the counter 1008. When the second pulse is sent, the binary counter 1008 is then triggered to send a corresponding pulse to the second multivibrator 1012. The pulse signals the rest of the circuit that there has been a valid trip; that is, two consecutive cycles in phase combined with the loss of the guard tone $f_0$.

Upon receipt of the signal by the second multivibrator 1012, there is a resultant logical 1 trip signal sent from the output of the multivibrator 1012 to the input-output section 238 as well as to the protection system to trip the circuit breakers protecting the protected zone. The normal non-trip output, from the second multivibrator 1012 is a logical 0.

The third multivibrator 1010 is present to reset the counter 1008. It resets the counter to verify that only two consecutive pulses combine to have a trip output. If one pulse is in phase and the second is not, then there is a master reset to clear that stage. Consequently, the main purpose of the third multivibrator 1010 is to constantly reset the counter 1008 after every county of two pulses in phase.

In a single end feed situation, the single end feed section 216 is activated. Upon activation of the single end feed section 216 by the remote site, the Mark tone $f_4$ is sent from the remote to the local. This mark tone is a signal having the frequency $f_4$ (2,470 Hz). It provides a logical 1 or high level at the local to be phase compared. The remote circuit breaker auxiliary contact will signal the single end feed section 216 of the remote audio bandwidth interface module to send the tone. The local remote reconstruction section 220 will reconstruct the signal received from the telecommunication channel through the receiver/AGC section 224 and the high pass filter/decoder 232. The tone will be a pure tone; that is, non-modulated. It will also drop out the guard tone $f_0$. The loss of the guard tone $f_0$ along with receipt of a trip tone will give half of the information required for a phase comparison. The last part occurs when the local fault detector input trips and allows for the local and remote phase comparison function to produce a trip output.

The following table may be useful in visualizing the operation of the module.

TABLE 1

TRUTH TABLE

| FD | BL | L | R | F (output) |
|---|---|---|---|---|
| 0 | 0 | 0 | 0 | 0 |
| 0 | 0 | 0 | 1 | 0 |
| 0 | 0 | 1 | 1 | 0 |
| 0 | 1 | 0 | 0 | 0 |
| 0 | 1 | 0 | 0 | 0 |
| 0 | 1 | 0 | 1 | 0 |
| 0 | 1 | 1 | 0 | 0 |
| 0 | 1 | 1 | 1 | 0 |
| 1 | 0 | 0 | 0 | 0 |
| 1 | 0 | 0 | 1 | 0 |
| 1 | 0 | 1 | 0 | 0 |
| 1 | 0 | 1 | 1 | 1 |
| 1 | 1 | 0 | 0 | 0 |
| 1 | 1 | 0 | 1 | 0 |
| 1 | 1 | 1 | 0 | 1 |
| 1 | 1 | 1 | 1 | 1 |

FD = Fault Detector
BL = Block Trip
L = Local Signal
R = Remote Signal
F = (FD)(L)(R) + (FD)(BL)(L)
High = 1 = Trip (+ Logical 1)
Low = 0 = No Trip (0 Logical 0)

Figure 17:
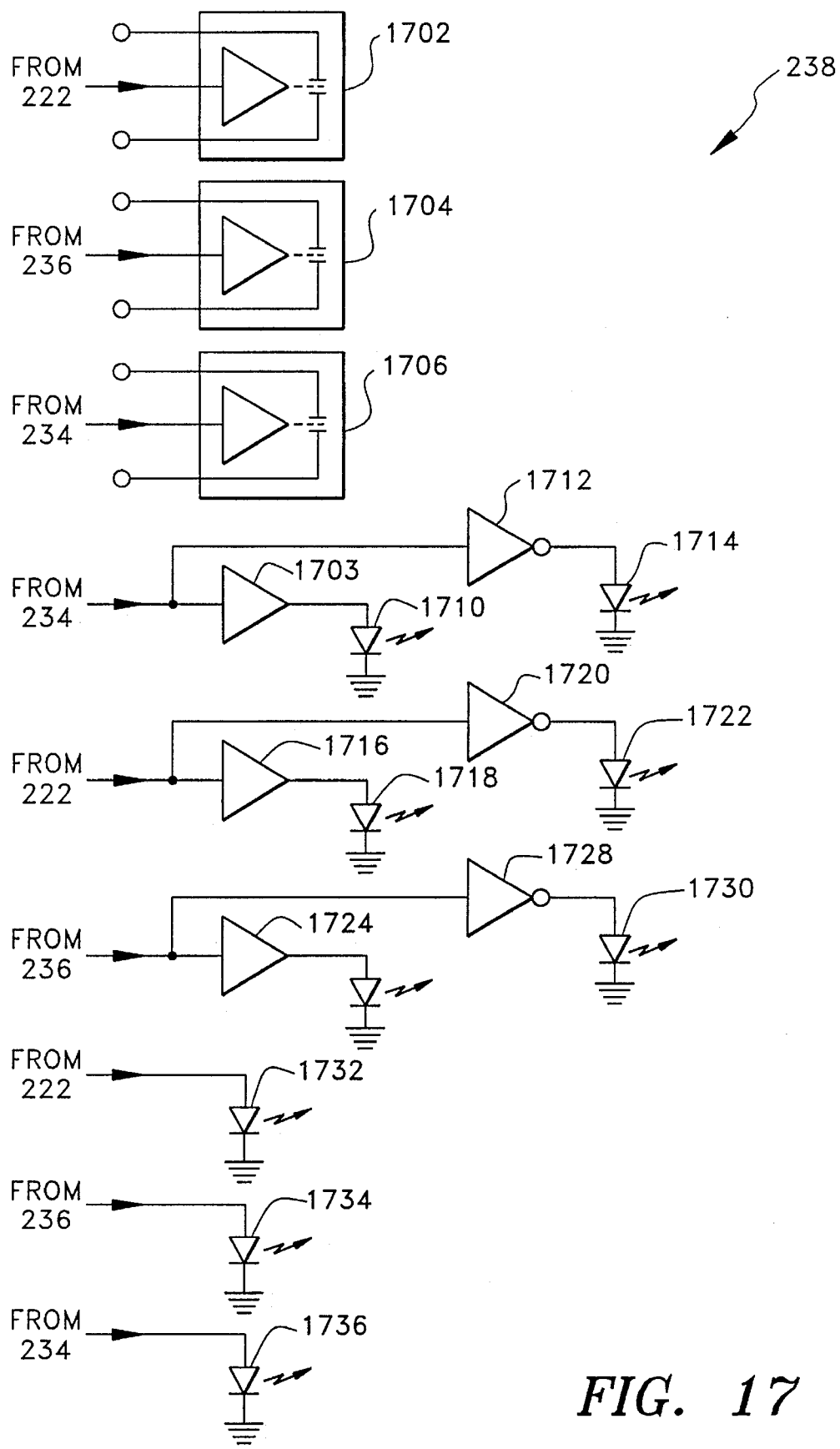
FIG. 17 is a functional block diagram of the input/output section of the audio band interface module depicted in FIG. 2.

Referring now to FIG. 17, the is depicted a functional block diagram of the input/output section 238. The output signal from the phase function section 222 is coupled to a control input of a first switch 1702; the inputs of a first amplifier 1716 and a second amplifier 1720. The output signal from the phase function section 222 is also coupled to the anode of a first light emitting diode (LED 1732). The output of the first amplifier 1716 is coupled to the anode of a second LED 1718. The output of the second amplifier 1720, which is the logical inverse of the output of the first amplifier 1716 is coupled to the anode of a third LED 1722. Upon receipt of a logical 1 signal, indicating a trip, from the phase function section 222, the contacts of the first switch 1702 will close; the first and second LEDs 1732 and 1718 will illuminate while the third LED 1722 will extinguish. The output signal from the DTT function section 236 is coupled to the control input of a second switch 1704; the inputs of a third amplifier 1724 and a fourth amplifier 1728 as well as the anode of a fourth LED 1734. The outputs of the third amplifier 1734 and the fourth amplifier 1728 are connected respectively to the anode of a fifth LED 1726 and a sixth LED 1730. Upon receipt of a signal from the DTT function section 236, the contacts of the second switch 1704 will close; the fourth and fifth LEDs 1734 and 1726 will illuminate while the sixth LED 1730 will extinguish. The output signal from the noise function section 234 is coupled to the control input of a third switch 1706; the inputs of a fifth amplifier 1708 and a sixth amplifier 1712; as well as the anode of a seventh LED 1736. The outputs of the fifth amplifier 1708 and sixth amplifier 1712 are connected respectively to the anode of an eighth LED 1710 and the anode of a ninth LED 1714. Upon receipt of a signal from the noise function section 234, the contacts of the third switch 1706 will close; the seventh and eighth LEDs 1736 and 1710 will illuminate while the 9th LED 1714 will extinguish. The contacts of the switches 1702, 1704 and 1706 can be employed by the user to initiate appropriate actions within the protection system such as opening of circuit breaker contacts.

I claim:

1. An audio bandwidth interface apparatus for use with a protective relay for an electrical power distribution system, said apparatus comprising:
   (a) means for receiving an output signal from said protective relay, which output signal is representative of line current conditions at a predetermined location in said electrical power distribution system;
   (b) means for converting said protective relay output signal into a first square wave signal;
   (c) means for generating at least a first local signal having at least a first frequency within the audio band;
   (d) means for generating a local audio bandwidth output signal for transmission to at least one remote audio bandwidth interface apparatus over an audio band communication channel, said local audio bandwidth output signal comprising said first local signal modulated by said first square wave;
   (e) means for receiving, from said audio band communication channel, a remote signal comprising the local audio bandwidth output signal generated by at least one remote audio bandwidth interface apparatus;
   (f) means for converting said remote signal into a second square wave signal;
   (g) means for imparting a predetermined delay to said first square wave signal; and
   (h) means for comparing the phase of said delayed first square wave signal with the phase of said second square wave signal and generating a trip output signal when said phase comparison exceeds predetermined limits.

2. An audio bandwidth interface apparatus in accordance with claim 1 wherein said delay is substantially equal to the delay in receiving the remote signal generated by said at least one remote audio bandwidth interface apparatus.

3. An audio bandwidth interface apparatus in accordance with claim 1 additionally comprising means for generating a direct transfer trip signal for transmission to at least one remote audio bandwidth interface apparatus over said audio band communication channel, said direct transfer trip signal comprising at least a fourth local signal having a fourth frequency within the audio band.

4. An audio bandwidth interface apparatus in accordance with claim 3 wherein said direct transfer trip signal comprises the sum of said third local signal having said third frequency within the audio band and a fourth local signal having a fourth frequency within the audio band.

5. An audio bandwidth interface apparatus in accordance with claim 1 including means for comparing the phase of said delayed first square wave signal with the phase of said second square wave signal and generating a trip output signal when said phase comparison exceeds predetermined limits for a predetermined period of time.

6. An audio bandwidth interface apparatus in accordance with claim 5 additionally comprising:
   (a) means for generating a second local signal having a second frequency within the audio band; and
   (b) means for generating a local audio bandwidth output signal for transmission to at least one remote audio bandwidth interface apparatus over an audio band communication channel, said local bandwidth output signal comprising the sum of said second local signal and said first local signal modulated by said first square wave.

7. An audio bandwidth interface apparatus in accordance with claim 6 additionally comprising means for detecting faults in said audio band communication channel.

8. An audio bandwidth interface apparatus in accordance with claim 7 wherein said means for detecting faults in said audio band communication channel comprises:
   (a) means for generating a third local signal having a third frequency within the audio band;
   (b) means for mixing the third local signal into said local audio bandwidth output signal;
   (c) means for detecting the absence of said third local signal in said received remote signal; and
   (d) selectively generating a trip output signal when the absence of said third local signal from said received remote signal exceeds a predetermined period of time.

9. A method for enabling a protective relay for an electrical power distribution system to communicate with at least one other protective relay comprised in the steps of:
   (a) receiving the output signal from said protective relay, which output signal is representative of line conditions at a predetermined location in said electrical power distribution system;
   (b) converting said protective relay output signal into a first square wave signal;
   (c) generating at least a first local signal having at least a first frequency within the audio band;
   (d) generating a local audio bandwidth output for transmission to said at least one remote audio bandwidth interface apparatus over an audio band communication channel, said audio bandwidth output signal comprising said first local signal modulated by said first square wave;
   (e) receiving, from said audio band communication channel, a remote signal comprising the local audio bandwidth output signal generated by at least one remote audio bandwidth interface apparatus;
   (f) converting said remote signal into a second square wave signal;
   (g) imparting a predetermined delay to said first square wave signal; and
   (h) comparing the phase of said delayed first square wave signal with the phase of said second square wave signal and generating a trip output signal when said phase comparison exceeds predetermined limits.

10. The method in accordance with claim 9 additionally comprising the step of generating a direct transfer trip signal for transmission to at least one remote audio bandwidth interface apparatus over said audio bandwidth communication channel, said direct to transfer trip signal comprising at least a fourth local signal having a fourth frequency within the audio band.

11. The method in accordance with claim 9 wherein step (g) comprises imparting a delay to said first square wave signal which is substantially equal to the delay in receiving the remote signal generated by said at least one remote audio bandwidth interface apparatus.

12. The method in accordance with claim 11 wherein said direct transfer trip signal comprises the sum of said third local signal having said third frequency within the audio band and a fourth local signal having a fourth frequency within the audio band.

13. The method in accordance with claim 9 wherein step (h) comprises comparing the phase of said delayed first square wave signal with the phase of said second square wave signal and generating a trip output signal when said phase comparison exceeds predetermined limits for a predetermined period of time.

14. The method in accordance with claim 13 additionally comprising the steps of:

(i) generating a second local signal having a second frequency within the audio band; and (j) generating a local audio bandwidth output signal for transmission to at least one remote audio bandwidth interface apparatus over an audio band communication channel, said local bandwidth output signal comprising the sum of said second local signal and said first local signal modulated by said first square wave.

15. The method in accordance with claim 14 additionally comprising the step of detecting faults in said audio band communication channel.

16. The method in accordance with claim 15 wherein said step of detecting faults in said audio band communication channel comprises the steps of:

(a) generating a third local signal having a third frequency within the audio band;

(b) mixing the third local signal into the local audio bandwidth output signal;

(c) detecting the absence of said third local signal in said received remote signal; and (d) selectively generating a trip output signal when the absence of said third local signal from said received remote signal exceeds a predetermined period of time.

17. A pilot wire relay system for protecting at least a portion of an electrical power distribution system, said pilot wire relay system comprising:

(a) a first pilot wire relay positioned at one end of a protected zone of said electrical power distribution system for monitoring electrical current flowing in the electrical power distribution system at said one end;

(b) a second pilot wire relay positioned at the other end of said protected zone for monitoring current flowing in the electrical power distribution system at said other end; and (c) a first audio bandwidth interface module connected between said first pilot wire relay and one end of an audio bandwidth communication channel and a second audio bandwidth interface module connected between said second pilot wire relay and the other end of said audio bandwidth communication channel, each of said first and second audio bandwidth interface modules comprising:

(1) means for receiving an output signal from the pilot wire relay to which said audio bandwidth interface module is connected, which output signal is representative of line current conditions at the end of the protected zone at which said pilot wire relay is positioned;

(2) means for converting said pilot wire relay output signal into a first square wave signal;

(3) means for generating at least a first local signal having at least a first frequency within the audio band;

(4) means for generating a local audio bandwidth output signal for transmission to the second audio bandwidth interface module over the audio bandwidth communication channel, said local audio bandwidth output signal comprising said first local signal modulated by said first square wave;

(5) means for receiving, from said audio bandwidth communication channel, a remote signal comprising the local audio bandwidth output signal generated by the second audio bandwidth interface module;

(6) means for converting said remote signal into a second square wave signal;

(7) means for imparting a predetermined delay to said first square wave signal; and (8) means for comparing the phase of said delayed first square wave signal with the phase of said second square wave signal and generating a trip output signal when said phase comparison exceeds predetermined limits.

18. The pilot wire relay system in accordance with claim 17 wherein each audio bandwidth interface module additionally comprises means for detecting faults in said audio bandwidth communication channel, said fault detecting means comprising:

(a) means for generating a second local signal having a second frequency within the audio band;

(b) means for mixing the second local signal into said local audio bandwidth output signal;

(c) means for detecting the absence of said second local signal in said received remote signal; and (d) selectively generating a trip output signal when the absence of said second local signal from said received remote signal exceeds a predetermined period of time.

19. The pilot wire relay system in accordance with claim 18 additionally comprising:

(a) means for generating a direct transfer trip signal for transmission to the other audio bandwidth interface module over said audio bandwidth communication channel, said direct transfer trip signal comprising at least a third local signal having a third frequency within the audio band.

\* \* \* \* \*